United States Patent
Lipscomb et al.

(10) Patent No.: US 12,550,922 B2
(45) Date of Patent: *Feb. 17, 2026

(54) EXTRUDED GELLING FOOD PRODUCTS, EXTRUDED GELLING FOOD PRODUCT INGREDIENTS, AND METHODS FOR MAKING EXTRUDED GELLING FOOD PRODUCTS AND EXTRUDED FOOD PRODUCT INGREDIENTS

(71) Applicant: GHL Specialty Flours, LLC, Cedarburg, WI (US)

(72) Inventors: John M. Lipscomb, Cedarburg, WI (US); Omar I. Rodriguez, Cedarburg, WI (US)

(73) Assignee: GHL Specialty Flours, LLC, Cedarburg, WI (US)

( * ) Notice: Subject to any disclaimer, the term of this patent is extended or adjusted under 35 U.S.C. 154(b) by 673 days.

This patent is subject to a terminal disclaimer.

(21) Appl. No.: 17/373,769

(22) Filed: Jul. 12, 2021

(65) Prior Publication Data

US 2021/0337851 A1 Nov. 4, 2021

Related U.S. Application Data

(63) Continuation-in-part of application No. 16/631,986, filed on Jan. 17, 2020, now Pat. No. 12,279,638, and a continuation-in-part of application No. 16/702,534, filed on Dec. 3, 2019, now Pat. No. 11,528,914.

(60) Provisional application No. 63/220,560, filed on Jul. 11, 2021, provisional application No. 63/220,506, filed on Jul. 10, 2021.

(51) Int. Cl.
| | |
|---|---|
| A23L 29/212 | (2016.01) |
| A21D 2/18 | (2006.01) |
| A23D 7/005 | (2006.01) |
| A23D 7/04 | (2006.01) |
| A23G 9/34 | (2006.01) |
| A23L 7/126 | (2016.01) |
| A23L 19/18 | (2016.01) |
| A23P 30/25 | (2016.01) |

(52) U.S. Cl.
CPC ............ *A23L 29/212* (2016.08); *A21D 2/186* (2013.01); *A23D 7/0053* (2013.01); *A23D 7/04* (2013.01); *A23G 9/34* (2013.01); *A23L 7/126* (2016.08); *A23L 19/18* (2016.08); *A23P 30/25* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 3,579,352 A | 5/1971 | Bookwalter et al. | |
| 4,478,857 A | 10/1984 | Stauss | |
| 2003/0003214 A1* | 1/2003 | Kraklow | A21D 10/025 426/551 |
| 2007/0292583 A1 | 12/2007 | Haynes et al. | |
| 2010/0095899 A1 | 4/2010 | Lipscomb et al. | |
| 2014/0069344 A1 | 3/2014 | Lipscomb et al. | |
| 2014/0069345 A1 | 3/2014 | Lipscomb et al. | |
| 2014/0069346 A1 | 3/2014 | Lipscomb et al. | |
| 2014/0335323 A1 | 11/2014 | Lipscomb | |
| 2015/0145164 A1 | 5/2015 | Lipscomb | |
| 2015/0181832 A1 | 7/2015 | Lipscomb | |
| 2015/0181834 A1 | 7/2015 | Lipscomb | |
| 2015/0196005 A1 | 7/2015 | Lipscomb | |
| 2015/0238931 A1 | 8/2015 | Lipscomb et al. | |
| 2016/0165835 A1 | 6/2016 | Lipscomb et al. | |
| 2016/0214081 A1 | 7/2016 | Lipscomb | |
| 2016/0346981 A1 | 12/2016 | Lipscomb | |
| 2016/0362345 A1 | 12/2016 | Lipscomb | |
| 2017/0188540 A1 | 7/2017 | Lipscomb et al. | |

(Continued)

FOREIGN PATENT DOCUMENTS

| | | |
|---|---|---|
| CN | 1357562 | 7/2002 |
| EP | 1656837 | 5/2006 |

(Continued)

OTHER PUBLICATIONS

Ozcan, Serap and Jackson, David S., "Functionality Behavior of Raw and Extruded Corn Starch Mixtures" (2005). Faculty Publications in Food Science and Technology. 102.
Rheological properties of reactive extrusion modified waxy starch and waxy starch-polyacrylamide copolymer gels; Starch/Stärke 2013, 65, 984-990.
Chapter 1—General Overview of Food Hydrocolloids from Cellulose and Cellulose Derivatives in the Food Industry: Fundamentals and Applications, First Edition. Tanja Wustenberg. 2015 Wiley-VCH Verlag Gmbh & Co. KGaA. Published 2015 by Wiley-VCH Verlag Gmbh & Co. KGaA.

(Continued)

*Primary Examiner* — Jyoti Chawla
(74) *Attorney, Agent, or Firm* — Boyle Fredrickson, S.C.

(57) ABSTRACT

A gelling food product constituent extrudate that forms a gel when water is added that is used as an ingredient of a food product in place of a gelling gum, like guar gum, xanthan gum, or carrageenan. The gelling extrudate is composed of cold-water soluble gelling pregelatinized starch formed of starch in a cereal grain and/or legume containing admixture modified by extrusion at pressures greater than 2000 PSI that causes the extrudate to gel when mixed with water. The gelling extrudate preferably also is composed of other starch in the admixture extrusion modified into different molecular weight polymers of a cold-water soluble gellant that also polymerizes and forms a gel, preferably a hydrocolloid gel, more preferably a self-gelling gel, even more preferably a thermo-reversible gel, when mixed with water. When mixed with water, a gelling extrudate of the present invention forms a thicker gel whose viscosity increases over time.

46 Claims, No Drawings

(56) References Cited

U.S. PATENT DOCUMENTS

| | | | |
|---|---|---|---|
| 2017/0245460 A1 | 8/2017 | Lipscomb et al. | |
| 2019/0350162 A1 | 11/2019 | Lipscomb et al. | |
| 2020/0163366 A1 | 5/2020 | Lipscomb et al. | |
| 2020/0296975 A1 | 9/2020 | Lipscomb et al. | |
| 2023/0028386 A1 | 1/2023 | Lipscomb | |

FOREIGN PATENT DOCUMENTS

| | | | |
|---|---|---|---|
| JP | S62 143659 | 6/1987 | |
| JP | S62 208246 | 9/1987 | |
| WO | 9922607 | 5/1999 | |
| WO | WO-0152670 A1 * | 7/2001 | ........... A23C 20/005 |

OTHER PUBLICATIONS

Hydrocolloids in Food Processing, Thomas R. Laaman, © 2011 Blackwell Publishing, Ltd. and Institute of Food Technologists, by Wiley-Blackwell IFT Press.

Chapter 1—The Role of Hydrocolloids in the Development of Food Structure: Food Chemistry, Function and Analysis No. 18 Handbook of Food Structure Development, Edited by Fotis Spyropoulos, Aris Lazidis and Ian T. Norton by The Royal Society of Chemistry 2020; Published by the Royal Society of Chemistry.

Majzoobi et al., Granular cold-water swelling starch; properties, preparation and applications, a review; Food Hydrocolloids 111 (2021) 106393.

Understanding and Measuring the Impact of Process Inputs on Degree of Cook in Starch-Based Systems, Bhimalingeswarappa Geera, 2009 Phd Thesis Dissertation at the University of Nebraska.

Soumya Banerjee & Suvendu Bhattacharya (2012) Food Gels: Gelling Process and New Applications, Critical Reviews in Food Science and Nutrition, 52:4, 334-346, DOI: 10.1080/10408398. 2010.500234.

Chapter 5—Application of Natural Polymers in Food; © Springer International Publishing Switzerland 2016; O. Olatunji (ed.), Natural Polymers, DOI 10.1007/978-3-319-26414-1_5.

Vallons et al., "Promoting Structure Formation by High Pressure in Gluten-Free Flours", LWT-Food Science and Technology, vol. 44, No. 7, Sep. 1, 2011, pp. 1672-1680.

Murekatete, Nicole et al., "Characterization of Ready-to-Eat Composite . . . ", Pakistan Journal of Nutrition, Feb. 1, 2020, pp. 171-178.

Licata, Rebecca et al., "Determination of Formulation and Processing Factors Affecting Slowly Digestible Starch . . . ", International Journal of Food Science and Technology, vol. 49, No. 5, Dec. 30, 2013.

Mahasukhonthachat K et al., "Kinetics of Starch Digestion and Functional Properties of Twin-Screw Extruded Sorghum", Journal of Cereal Science, Academic Press Ltd, GB, vol. 51, No. 3, May 1, 2010.

Physical and nutritional impact of fortification of corn starch-based extruded snacks with common bean (*Phaseolus vulgaris* L.) flour: Effects of bean addition and extrusion cooking, Food Chemistry, vol. 113, Issue 4, 2009, pp. 989-996, ISSN 0308-8146.

* cited by examiner

EXTRUDED GELLING FOOD PRODUCTS, EXTRUDED GELLING FOOD PRODUCT INGREDIENTS, AND METHODS FOR MAKING EXTRUDED GELLING FOOD PRODUCTS AND EXTRUDED FOOD PRODUCT INGREDIENTS

CROSS-REFERENCE TO RELATED APPLICATIONS

This application is a continuation-in-part of and claims priority in U.S. patent application Ser. No. 16/702,534, filed Dec. 3, 2019, and in U.S. patent application Ser. No. 16/631,986, filed Jul. 17, 2020, the entirety of both of which are hereby expressly incorporated herein by reference. This application also claims priority in U.S. Provisional Patent Application Ser. No. 63/220,506 filed Jul. 10, 2021, and in U.S. Provisional Patent Application Ser. No. 63/220,560 filed Jul. 11, 2021, the entirety of both of which are hereby expressly incorporated herein by reference.

FIELD OF THE INVENTION

The present invention relates generally to the field of food science. More particularly, the present invention relates to (a) extruded food products including extruded instantized food products, extruded pregel food products, and extruded gelling food products, (b) extruded food product constituents used as ingredients of food products including extruded instantized food product constituents, extruded pregel food product constituents, and extruded gelling food product constituents, (c) methods of making the same by extrusion including methods of making extruded instantized food products and extruded instantized food product constituents used as ingredients in food products, extruded pregel food products and extruded pregel food product constituents used as ingredients in food products, and extruded gelling food products and extruded gelling food product constituents used as ingredients in food products, and (d) food products made with extruded instantized food product constituents used as ingredients therein, extruded pregel food product constituents used as ingredients therein, and extruded gelling food product constituents used as ingredients therein.

BACKGROUND OF THE INVENTION

There are many types and varieties of food products that the consumer can purchase at their local grocery store with ever more choices being made available to them every year. There are many types of conventional food products that have always been available for consumer purchase including meats and meat products, dairy products including milk, cream, whipped cream, cream cheese, cheese, and ice cream, and ready-to-eat food products like microwavable "TV" dinners, wet semisolid pureed baby food, porridges, and puddings, to name a few.

More recently, there has been a proliferation of dozens of new alternative food products providing more health and wellness conscious consumers with food product choices like meatless meat substitutes aka meatless meat substitute food products and non-dairy dairy substitutes aka non-dairy dairy substitute food products. Meatless meat-substitutes are typically gluten free and can be vegan, have a base made of processed vegetable ingredients like soy protein concentrate, textured pea protein, textured wheat protein, rice protein, along with one or more oils like canola oil, palm oil, coconut oil and sunflower oil, with the base of certain types of commercially available meatless meat substitutes made of (i) textured pea protein blend composed of pea protein, fermented pea and rice protein, canola oil and palm oil used to make meatless plant-based ground beef style or flavored burgers, (ii) textured pea protein, textured wheat protein, palm oil, coconut oil and vital wheat gluten also used to make meatless plant-based beef style or flavored burgers, (iii) soy protein concentrate, coconut oil, and sunflower oil also used to make plant-based meatless beef style or flavored burgers, (iv) soy protein concentrate, expeller pressed canola oil, refined coconut oil, soy flour, isolated soy protein, and methylcellulose also used to make a meatless plant-based beef style or flavored burger, (v) soy protein concentrate, expeller pressed canola oil, refined coconut oil, soy flour, and isolated soy protein used to make meatless plant-based chicken style or flavored burgers, (vi) textured soybean protein, soybean protein powder and wheat protein concentrate used to make vegan meatless chicken, and (vii) pea protein, refined coconut oil and sunflower oil used to make a meatless plant-based sausage.

Non-dairy dairy food product substitutes are typically gluten free and can also be vegan, include (a) non-dairy milks (aka milk substitutes, milk alternatives, or alternative milks) are made of a base typically composed o (i) almonds, (ii) sprouted almonds, (iii) soybeans, (iv) oats that are typically processed to be gluten free, (v) flax or flaxseed oil, e.g., cold-pressed flaxseed oil, (vi) oat and flaxseed, (vii) bananas and sunflower seed, (viii) coconuts, or (ix) cashews, (b) non-dairy creamers or creamer alternatives typically are made with a base composed of (i) coconut, (ii) coconut cream, (iii) macadamias, (iv) almonds, (v) almond milk, (vi) almonds and coconut cream, (vii) oats, or (viii) soy, (c) non-dairy whipped creams (aka whipped cream substitutes, whipped cream alternatives, or alternative whipped creams) are made of a base typically composed of (i) soy, (ii) rice, (iii) almonds, (iv) coconut cream, (v) oats, or (vi) palm kernel oil, tapioca syrup, tapioca maltodextrin, and soy protein concentrate, (d) non-dairy yogurts (aka yogurt substitutes, yogurt alternatives, or alternative yogurts) are made of a base typically composed of (i) coconut water and coconut cream, (ii) almond milk and almonds, (iii) coconut milk, (iv) soymilk made of soybeans, (v) coconuts, (vi) almond milk from almonds and rolled oats, (vii) cashewmilk from cashews, or (viii) coconuts and cashewmilk, (e) non-dairy butters (aka butter substitutes, butter alternatives, or alternative butters), which are typically also gluten free and many of which are also vegan, whose base is typically made of (i) coconut oil, potatoes, carrots and sunflower oil, (ii) coconut oil, sunflower oil and cashews, (iii) sunflower oil, almond milk, and coconut oil, (iv) coconut oil, cashewmilk, and sunflower oil, or (v) sunflower oil, oat milk, and coconut oil, (f) non-dairy cream cheeses (aka cream cheese substitutes, cream cheese alternatives, or alternative cream cheeses) are made of a base typically composed of (i) almond milk, (ii) soy, (iii) oats, (iv) coconuts, (v) coconut milk, or (vi) cashews, (g) non-dairy cheeses (aka cheese substitutes, cheese alternatives, or alternative cheeses) are made of a base typically composed of (i) coconut oil and potato starch (non-dairy feta style and/or flavored alternative), (ii) coconut oil, potato-corn starch, and potato starch (non-dairy cheddar and provolone style and/or flavored cheese alternatives), (iii) coconut oil, modified potato and corn starches, and potato starch (non-dairy provolone style and/or flavored cheese alternative), (iv) coconut oil, modified potato and corn starches, and potato starch (non-dairy American style and/or flavored cheese alternative), (v) an almond milk (non-dairy ricotta style and/or flavored cheese alternative), (vi) expeller blend of palm fruit oil, soybean oil, and olive oil (non-dairy ricotta flavored and/or style cheese alternative), (vii) an almond base (non-dairy mozzarella style and/or flavored cheese alternative), (viii) tapioca starch, coconut oil, expeller pressed canola oil and/or safflower oil (non-dairy Havarti style and/or flavored cheese alternative), or (ix) coconut oil, modified potato and corn starches, potato starch, and ground sunflower kernels (non-dairy Colby Jack style and/or flavored cheese alternative), and (h) non-dairy ice creams (aka ice cream substitutes, ice cream alternatives, or alternative ice creams), which are typically also gluten free and many of which are also vegan, have a base typically made of (i) almonds, (ii) almond milk, (iii) coconut, (iv) coconut cream, (v) coconut milk, (vi) banana and coconut cream, (vii) cashew milk, (viii) oat milk and coconut oil, (ix) soy, (x) pea protein and coconut oil, (xi) avocado, or (xii) peanuts.

The base of nearly all the above-described non-dairy dairy alternative food products, aka dairy substitute food products or dairy substitutes, are made using relatively costly, time consuming, and energy intensive processes and typically are composed of ground or otherwise processed grains, such as oats and rice, legumes, such as soybeans, and nuts, such as almonds and cashews, which, along with water, makeup the principal ingredients of these food products by weight percentage. The base of many of non-dairy substitute food products are made by processing the grains, such as oats and rice, legumes, such as soybeans, and nuts, such as almonds and cashews, that make up their primary ingredients in a manner that retains or isolates one or more of their protein, starches, and fiber, such as by, grinding, cooking, e.g., enzyme cooking with amylase, and separating constituents, such as to remove either their fiber or both their proteins and fiber, typically via filtration, to thereby produce a dairy-substitute food product base, typically in the form of a slurry, to which additional ingredients are added in lesser amounts along with one or more additional process steps performed, such as mixing, cooking, and/or cooling, to obtain the finished dairy-substitute food product.

Additional ingredients, including one or more gums, are typically added to these non-dairy dairy substitute food product bases in lesser amounts or lesser weight percentages. Among these ingredients added in small amounts are conventional gums, such as one or more of acacia gum, gellan gum, locust bean gum, guar gum, xanthan gum, cellulose gum, tara gum, and/or carrageenan, in an amount that is at least two percent by weight of the base and/or finished non-dairy food product, and which typically ranges between two percent and three percent of one or more of these gums by weight of the base and/or finished non-dairy food product.

Gums, are also known as hydrocolloids or polysaccharides, are very versatile biopolymers that have widespread use in the food sector as functional ingredients or function additives as their varied molecular polysaccharide compositions gives them certain properties, such as gelling, thickening, moisture retention, emulsification, and stabilization, which are very useful in the food industry. The term "gum" is generally used to define hydrophilic or hydrophobic molecules of high molar mass, which have colloidal properties. Gums are polysaccharides which are complex carbohydrates that are soluble in water, which can form gels and mucilages. Gums typically have gelling characteristics, thickening characteristics, moisture retention, emulsification characteristics and stabilization properties and have applications as gelling agents, thickening agents, humectants, viscosity modifies, emulsifiers, and stabilizers in the food industry. Gums are widely used in the food industry in confectionery food products, as ice cream stabilizers, food emulsions, thickeners or thickening agents, viscosity controllers or viscosity control agents, in the microencapsulation of flavors and dyes, clarifiers, and beverage stabilizers. Gums are widely used in many types of food products, including creams, sauces, soups, porridges, puddings, ice creams, meatless meat-substitutes, and non-dairy dairy substitutes, including virtually all of the non-dairy dairy substitutes discussed above.

In one known non-dairy dairy substitute or dairy alternative food product base, a multi-gum blend having at least a plurality of xanthan gum, guar gum, and carrageenan, which in one multi-gum blend formulation contains all three of these conventional gums, is used in an amount of at least two percent and no more than five percent by weight of the base or finished non-dairy food product, and which typically contains between two percent and three percent by weight of this three-gum blend. Not only are all these conventional gums quite costly to produce, but many of these conventional gums produce a non-dairy dairy substitute food product where one or more of its texture, consistency, flavor, aroma, and/or mouthfeel differ from and typically are less desirable compared to the corresponding texture, consistency, flavor, aroma, and/or mouthfeel its actual dairy food product counterpart. In addition, many of these conventional gums have limitations that restricts their use to certain types of foods.

What is needed is a gelling food product constituent that can be used as a food product ingredient and which gels and/or which produces a gel upon wetting with water that can be substituted in place of at least some of these conventional gums used in food products, including meatless meat-substitute food products and non-dairy dairy substitute or dairy alternative food products thereby reducing the amount of conventional gums actually used in these food products. What also is needed is a gelling food product constituent that is a conventional gum substitute or conventional gum replacement used in place of conventional gum (s) as an ingredient in food products that have typically required conventional gum(s) in the past.

SUMMARY OF THE INVENTION

The present invention is directed to an extruded gelling food product constituent that is composed of a gelling food product constituent extrudate extruded from a starch-containing admixture subjected to sufficiently high extrusion pressures and extrusion conditions within an extruder to modify, preferably physically modify, starch in the admixture into a water-soluble extrusion-modified starch gellant that gels and/or forms a gel when wetted with water, thereby configuring the gelling food product constituent extrudate and extruded gelling food product constituent composed of the gelling food product constituent extrudate to gel and/or form a gel when wetted with water. As discussed in more detail below, in one preferred embodiment, other starch of the starch-containing admixture is modified, preferably also physically modified, by the high extrusion pressure and extrusion conditions within the extruder such that pregelatinized starch also is formed in the gelling food product constituent extrudate producing an extruded gelling food product constituent in accordance with the present invention configured with two-component gelling, with one gelling component provided by the water-soluble extrusion-modified starch gellant in the gelling food product constituent extrudate, and the other gelling component provided by the water-soluble pregelatinized starch in the gelling food product constituent extrudate. As discussed herein in more detail, the resultant extruded gelling food product constituent is comminuted into relatively small particles sizes having the size of grits, powder or flour for use as a food product ingredient. Where the extruded gelling food product constituent is solely composed of gelling food product constituent extrudate and contains no other constituents, the gelling food product constituent extrudate is comminuted during extrusion into pellets or granules that are further comminuted by grinding or milling into smaller sized particles having the size of grits, powder or preferably flour used as a food product ingredient.

In one preferred embodiment, the extrusion pressures and extrusion conditions within the extruder modify some of the starch in the starch-containing admixture into a plurality of different molecular weight extrusion-modified starch polymers or starch-based polymers that form the water-soluble extrusion-modified starch gellant that polymerize into a hydrocolloid gel when wetted with and preferably mixed with water. In another preferred embodiment, the extrusion pressures and extrusion conditions within the extruder also modify and/or free up some of the protein or proteins in the starch-containing admixture into a crosslinker that forms part of the water-soluble extrusion-modified starch gellant that cros slinks the plurality of different molecular weight starch polymers or starch-based polymers of the gellant when wetted with and preferably mixed with water. In one such preferred embodiment where the water-soluble extrusion-modified starch gellant contains both (a) extrusion-modified starch or starches that forms a plurality of different molecular weight extrusion-modified starch polymers or different molecular weight extrusion-modified starch-based polymers, and (b) extrusion-modified or extrusion-freed protein or proteins that crosslink the different molecular weight extrusion-modified starch polymers or different molecular weight extrusion-modified starch-based polymers when an extruded gelling food product constituent composed of food product constituent extrudate containing such an extrusion-modified starch polymer and protein crosslinker starch gellant is wetted with water, the resultant self-gelling gel formed preferably is a thermoreversible gel.

In a preferred embodiment, the water-soluble extrusion-modified starch gellant is a cold-water soluble hydrocolloid when wetted with room temperature water mixed therewith that forms a gel, preferably a self-gelling gel, which is thermally stable, and which preferably produces thermally and shelf-life stable food emulsions when used as an ingredient of a food product. In one such preferred embodiment, the extruded gelling food product constituent is composed of gelling food product constituent extrudate that not only contains water-soluble extrusion-modified starch gellant but also contains pregelatinized starch formed of other starch in the admixture modified, preferably also physically modified by extrusion pressure during extrusion in pregelatinized starch, which also gels when wetted with water mixed therewith producing a dual-gelling component gelling food product constituent extrudate containing one gelling component, namely water-soluble extrusion-modified starch gellant that gels when wetted, but also a second gelling component, namely pregelatinized starch that also gels when wetted.

In a preferred method and embodiment, the cold water-soluble extrusion-modified starch gellant is present at a great enough weight percent of at least five percent, preferably at least ten percent, more preferably at least fifteen percent, within the resultant gelling food product constituent extrudate that imparts a gelling property throughout the entire extrudate and extruded food product constituent composed of the gelling extrudate when wetted with water mixed uniformly using a mixer that preferably is a high shear mixer. In another preferred method and embodiment where the gelling food product constituent extrudate is a dual-gelling component extrudate, (a) the cold water-soluble extrusion-modified starch gellant is present at a great enough weight percent of at least five percent, preferably at least ten percent, more preferably at least fifteen percent, within the resultant gelling food product constituent extrudate, and (b) the cold water-soluble extrusion-modified starch pregelatinized starch is present at a great enough weight percent of at least five percent, preferably at least ten percent, more preferably at least fifteen percent, within the resultant gelling food product constituent extrudate, whereby both gelling components synergistically impart a gelling property throughout the entire extrudate and extruded food product constituent composed of the gelling extrudate when wetted with water mixed uniformly therewith using a mixer that preferably is a high shear mixer.

A preferred embodiment of an extruded gelling food product constituent of the present invention is composed of water-soluble extrusion-modified starch gellant that is cold water soluble that gels and preferably forms a gel when wetted with water that is mixed therewith, preferably using a mixer that more preferably is a high shear mixer, that is a conventional gum substitute or conventional gum replacement that more preferably is a guar gum replacement or guar gum substitute that replaces guar gum as an ingredient of a food product. In another preferred embodiment, extruded gelling food product constituent is composed of gelling food product constituent extrudate containing water-soluble extrusion-modified starch gellant and which is configured to be a conventional gum substitute or conventional gum replacement that replaces or substitutes for at least one of xanthan gum and carrageenan as an ingredient of a food product that would ordinarily require one or more such conventional gums. In another preferred embodiment, the extruded gelling food product constituent composed of gelling food product constituent extrudate containing water-soluble extrusion-modified starch gellant configured for use as at least one or both of the aforementioned conventional gum substitutes or replacements is also composed of a second gelling component in the form of pregelatinized starch formed from other starch modified during extrusion as discussed in more detail above and elsewhere herein.

A preferred embodiment of an extruded gelling food product constituent is composed of gelling food product constituent extrudate that configures the extruded gelling food product constituent to be used as an ingredient in one or more of the different types of the above-identified non-dairy dairy substitute or dairy alternative food products as discussed in more detail hereinbelow. In one such preferred embodiment, the extruded gelling food product constituent is composed of gelling food product constituent extrudate that configures the extruded gelling food product constituent to be used as an ingredient that is a replacement or substitute for one or more conventional gum(s) used in one or more of the different types of the above-identified non-dairy dairy substitute or dairy alternative food products. In another such preferred embodiment, the extruded gelling food product constituent is composed of gelling food product constituent extrudate that configures the extruded gelling food product constituent that is a gum replacement or gum substitute that at least partially and preferably completely replaces at least one conventional gum, preferably more than one conventional gum, and preferably all of the conventional gums previously used in at least one of the one or more of the different types of the above-identified non-dairy dairy substitute or dairy alternative food products. In at least one preferred embodiment, the extruded gelling food product constituent composed of gelling food product constituent extrudate containing water-soluble extrusion-modified starch gellant configured for use as an ingredient in one or more of the aforementioned non-dairy dairy substitute or dairy alternative food products is also composed of a second gelling component in the form of pregelatinized starch formed from other starch modified during extrusion as discussed in more detail above and elsewhere herein.

Another preferred embodiment of an extruded gelling food product constituent is composed of gelling food product constituent extrudate that configures the extruded gelling food product constituent to be used as an ingredient in one or more of the different types of the above-identified meatless meat-substitute food products also discussed in more detail hereinbelow. In another such preferred embodiment, the extruded gelling food product constituent is composed of gelling food product constituent extrudate that configures the extruded gelling food product constituent to be used as an ingredient that is a replacement or substitute for one or more conventional gum(s) used in one or more of the different types of the above-identified meatless meat-substitute food products. In at least one preferred embodiment, the extruded gelling food product constituent composed of gelling food product constituent extrudate containing water-soluble extrusion-modified starch gellant configured for use as an ingredient in one or more of the aforementioned meatless meat-substitute food products is also composed of a second gelling component in the form of pregelatinized starch formed from other starch modified during extrusion as discussed in more detail above and elsewhere herein. In at least one such gum-replacement embodiment, the extruded gelling food product constituent composed of gelling food product constituent extrudate containing water-soluble extrusion-modified starch gellant configured for use as a gum-replacement ingredient in a food product is also composed of a second gelling component in the form of pregelatinized starch formed from other starch modified during extrusion as discussed in more detail above and elsewhere herein.

Such an extruded gelling food product constituent is composed of a gelling food product constituent extrudate of the present invention configured for the extruded gelling food product constituent to be used as a food product ingredient that is at least one of (a) a gelling agent, preferably a conventional gum substitute, (b) a thickener or thickening agent, preferably to thicken soups, porridges, sauces, dressings, creams, and puddings, (c) an emulsifier or emulsifying agent, preferably used to make food emulsions, (d) a humectant, to retain or absorb moisture in a food product, and/or (e) stabilizer or stabilizing agent, to prevent separation in emulsions used in dressings, and/or preventing ice crystal formation in ice cream. In one preferred embodiment, the gelling food product constituent extrudate configures the extruded gelling food product constituent as a food product ingredient that is at least a plurality of (a)-(e) with the extruded gelling food product constituent being used as one of (a)-(e) when used as an ingredient in one type of food product and being used as a different one of (a)-(e) when used as an ingredient in a different type of food product. In another preferred embodiment, the gelling food product constituent extrudate is configured such that the extruded gelling food product constituent is a food product ingredient that is at least a plurality of pairs, i.e., at least three, of (a)-(e), with it being used as a first one of (a)-(e) when used as an ingredient in a first type of food product, being used as a second one of (a)-(e) when used as an ingredient in a second type of food product, and being used as a third one of (a)-(e) when used as an ingredient in a third type of food product. In at least one such embodiment of a gelling agent, thickening agent, emulsifier humectant and/or stabilizer, the extruded gelling food product constituent composed of gelling food product constituent extrudate containing water-soluble extrusion-modified starch gellant configured for use as one or more of a gelling agent, thickening agent, emulsifier humectant and/or stabilizer in a food product is also composed of a second gelling component in the form of pregelatinized starch formed from other starch modified during extrusion as discussed in more detail above and elsewhere herein.

In a method of making an extruded gelling food product constituent in accordance with the present invention, an admixture composed of at least 10%, preferably at least 15%, and more preferably at least 25% starch having a moisture content no greater than 25%, preferably no greater than 20%, more preferably no greater than about 17%±2%, is extruded using an extruder that preferably is a single screw extruder at an extrusion pressure that preferably is an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder, which modifies, preferably physically modifies at least some of the starch in the admixture into a cold water-soluble extrusion-modified starch gellant, before gelling food product constituent extrudate containing the cold water-soluble extrusion-modified starch gellant substantially uniformly distributed throughout the extrudate is discharged through a perforate extrusion die at a discharge end of the extruder. During extrusion, the starch-containing admixture is subjected to an extrusion temperature of at least 100° Celsius and preferably at least 130° Celsius at such ultrahigh extrusion pressures. In order to preserve and freeze the cold water-soluble gelling and/or cold-water soluble gel forming properties of the cold water-soluble extrusion-modified starch gellant substantially uniformly distributed throughout the gelling food product constituent extrudate, the gelling food product constituent extrudate is cooled and dried after the gelling food product constituent extrudate exits the extrusion die in a manner that cools and dries the extrudate so without the application of any heat to the extrudate.

In at least one preferred extruded gelling food product constituent and/or gelling food product constituent extrudate method of manufacturing, the starch-containing admixture is extruded at an ultrahigh extrusion pressure of at least 7,500 PSI, can be and preferably is extruded in at least one method at an extrusion pressure of at least 10,000 PSI, and in at least one other method is extruded at an extrusion pressure of at least 15,000 PSI. In yet another method of extruding preferred extruded gelling food product constituent and/or gelling food product constituent extrudate, the starch-containing admixtures is extruded at an extrusion pressure of at least 20,000 PSI.

In a preferred method, the gelling food product constituent extrudate is comminuted into pellets or granules upon being discharged from the extrusion die, such as by a high speed rotary knife, which is then cooled and dried, without being heated, by turbulently flowing air, preferably room temperature turbulently flowing air that has a temperature of about 68° Fahrenheit±12 degrees Fahrenheit, which turbulently flowing air also used to transport the pellets or granules of the gelling food product constituent extrudate away from the extruder. In one such preferred method, the turbulently flowing room temperature air has a low enough temperature and a high enough volumetric flow rate of at least 300 cubic feet per minute, preferably at least 500 cubic feet per minute, and more preferably at least 800 cubic feet minute when flowing from a generally airtightly sealed knife cage enclosing the extruder die at the discharge end of the extruder through an elongate duct of a pneumatic conveyor to both cool and dry the pellets or granules of the gelling food product constituent extrudate the entire time being transported through the duct thereby (a) reducing the temperature of the pellets or granules of the gelling food product constituent extrudate by at least 30° Fahrenheit, preferably at least 40° Fahrenheit, and more preferably at least 50° Fahrenheit from the temperature at which the extrudate exited the extrusion die, and (b) reducing the moisture content of the pellets or granules of the gelling food product constituent extrudate by at least 3% by pellet or granule weight, preferably at least 4% by pellet or granule weight, and more preferably at least 5% by pellet or granule weight from the moisture content of the extrudate exiting the extrusion die. In one such preferred embodiment, such a cooling and drying without heating step using such turbulently flowing air dries the pellets or granules of gelling food product constituent extrudate to a moisture content of between 3% and 12% moisture content by pellet weight, preferably between 4% and 10% moisture content by pellet weight, and more preferably between 5% and 8% moisture content by pellet weight.

In a preferred method of making gelling food product constituent extrudate of the present invention, the aforementioned ultrahigh extrusion pressures and extruder parameters are configured or further configured to modify, preferably physically modify, other starch or other starches in the starch-containing admixture into a cold water soluble pregelatinized starch contained in the gelling food product constituent extrudate extruded from the extruder that also gels when wetted and preferably mixed with water thereby forming a dual gelling component gelling food product constituent extrudate of another preferred extruded gelling food product constituent embodiment of the present invention. As previously discussed, such a dual gelling component extrudate contains both cold water soluble pregelatinized starch and cold water-soluble extrusion-modified starch gellant with the pregelatinized starch component gelling and preferably forming a starch-type gel of starch in suspension, and the extrusion-modified starch gellant gelling and preferably forming a hydrocolloid gel that preferably is in the form of a temperature stable and physically stable emulsion, preferably food emulsion, when wetted with water and more preferably thoroughly mixed with water using a mixer that preferably is a high-shear mixer or the like.

In one preferred single gelling component or dual gelling component embodiment, starches in the starch-containing admixture are modified during ultrahigh pressure extrusion using an extruder that preferably is a single screw extruder subjecting starches in the starch-containing admixture to an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder thereby ultrahigh pressure extrusion modifying, preferably physically modifying, starch or starches in the admixture into a plurality of different molecular weight extrusion-modified starch polymers or starch-based polymers that form the water-soluble extrusion-modified starch gellant that polymerize into a hydrocolloid gel when wetted with water and preferably when a granular extruded gelling food product constituent composed of gelling food product constituent extrudate containing the plurality of different molecular weight extrusion-modified starch polymers or starch-based polymers is mixed with water using a mixer that preferably is a high shear mixer. As previously discussed, other starches in the starch-containing admixture can be and preferably are modified, preferably physically modified, into pregelatinized starch that forms the second gelling component of a dual gelling component gelling food product constituent extrudate of a dual gelling component extruded gelling food product constituent of the present invention.

In another preferred single gelling component or dual gelling component embodiment, the above starch-containing admixture also contains protein or proteins that together with the starch or starches in the admixture are subjected ultrahigh pressure extrusion in an extruder that preferably is a single screw extruder at an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder ultrahigh pressure extrusion modifying, preferably physically modifying, (a) starch or starches in the admixture into a plurality of different molecular weight extrusion-modified starch polymers or starch-based polymers that form the water-soluble extrusion-modified starch gellant that polymerize into a hydrocolloid gel when wetted with water, and (b) protein or proteins in the admixture into a crosslinker in the gellant that crosslink the plurality of different molecular weight extrusion-modified starch polymers or starch-based polymers that polymerize when wetted and preferably mixed with water preferably forming a self-gelling hydrocolloid gel. In still another preferred single gelling component or dual gelling component embodiment, the starch-containing admixture also contains protein or proteins that together with the starch or starches in the admixture are subjected ultrahigh pressure extrusion in an extruder that preferably is a single screw extruder at an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder ultrahigh pressure extrusion modifying, preferably physically modifying, starch or starches in the admixture into a plurality of different molecular weight extrusion-modified starch polymers or starch-based polymers that form the water-soluble extrusion-modified starch gellant that polymerize into a hydrocolloid gel when wetted with water, and (a) modifying, preferably physically modifying protein or proteins in the admixture into a crosslinker in the gellant that crosslink the plurality of different molecular weight extrusion-modified starch polymers or starch-based polymers that polymerize when wetted and preferably mixed with water preferably forming a self-gelling hydrocolloid gel, and/or (b) freeing protein or proteins in the admixture to function as a crosslinker in the gellant that crosslink the plurality of different molecular weight extrusion-modified starch polymers or starch-based polymers that polymerize when wetted and preferably mixed with water preferably forming a self-gelling hydrocolloid gel. As previously discussed, other starches in the starch-containing admixture can be and preferably are modified, preferably physically modified, into pregelatinized starch that forms the second gelling component of a dual gelling component gelling food product constituent extrudate of a dual gelling component extruded gelling food product constituent of the present invention.

In one or more or all of the preferred methods disclosed hereinabove, the cold water-soluble extrusion-modified starch gellant is substantially uniformly distributed throughout the gelling food product constituent extrudate so as to homogenously impart its gelling properties and ability to form a gel, preferably a hydrocolloid gel, more preferably a self-gelling hydrocolloid gel, and even more preferably a thermoreversible self-gelling hydrocolloid gel throughout the gelling food product constituent extrudate and extruded gelling food product constituent composed of the extruded gelling food product constituent. Where the extruded gelling food product constituent and gelling food product constituent extrudate is a dual gelling component extruded gelling food product constituent and dual gelling component gelling food product constituent extrudate, both the cold water soluble pregelatinized starch and the cold water-soluble extrusion-modified starch gellant are respectively substantially uniformly distributed throughout the gelling food product constituent extrudate so as to impart their respective gelling properties and their respective ability to form their two different types of gel are also substantially uniformly distributed throughout the dual gelling component extruded gelling extruded food product constituent and dual gelling component gelling extruded food product constituent extrudate. The single component and dual component gelling food product constituent extrudate respectively composed of single component gelling food product constituent extrudate and dual component gelling food product constituent extrudate are comminuted, preferably by grinding or milling into smaller more finely sized particles preferably having the consistency of powder or flour. As a result of being substantially uniformly throughout the extrudate and preferably the constituent composed of extrudate, only a small amount of the powdered or flour single component or dual component extruded food product constituent or gelling food product constituent extrudate needs to be added as a functional gelling, thickening, emulsifying, humectant or stabilizing ingredient of a food product, typically less than 30% by weight of the food product, preferably no more than 15% by weight of the food product, more preferably no more than 10% by weight of the food product, and even more preferably no more than about 5%±2.5% by weight of the food product.

In a preferred method and embodiment, the starch-containing admixture is composed of at least 30%, preferably at least 50%, more preferably at least 65% and even more preferably substantially completely composed of one or more cereal grains, preferably one or more sorghums, more preferably whole grain(s) of one or more sorghums, extruded in an extruder that preferably is a single screw extruder at such ultrahigh extrusion pressures and relatively short residency times as disclosed above forms a dual-component gelling food product constituent extrudate composed of (a) cold water soluble ultrahigh extrusion pressure modified starch gellant, and (b) pregelatinized starch formed of ultrahigh pressure extrusion modified starch that preferably is comminuted into granules or pellets by a rotary knife upon extrusion from the extruder die, cooled and dried, without heating, using turbulently flowing room temperature air before being further comminuted into smaller more finely sized particles having a size of (a) grits whose comminuted particles pass through a 1.19 mm sieve (US No. 14 mesh sieve) and ride on a 0.016 inch sieve (US Standard Mesh No. 40 mesh sieve), preferably pass through a 1.19 mm sieve (US Standard Mesh No. 14 mesh sieve) and ride on a 0.01 inch sieve (US No. 60 mesh sieve), (b) powder whose comminuted particles pass through a 297-µm sieve (US Standard Mesh No. 50 mesh sieve), or (c) flour where at least 80%, preferably at least 90%, more preferably at least 98% of its comminuted particles pass through a 212-µm sieve (US Standard Mesh No. 70 mesh sieve). In at least one method and embodiment, starch or starches in the one or more cereal grains, preferably one or more sorghums, more preferably whole grain(s) of the one or more sorghums of the admixture are ultrahigh extrusion pressure modified into plurality of different molecular weight extrusion-modified starch polymers or starch-based polymers that polymerize when wetted or mixed with room temperature water forming a hydrocolloid gel. In at least one such method and embodiment, starch or starches in the one or more cereal grains, preferably one or more sorghums, more preferably whole grain(s) of the one or more sorghums of the admixture are ultrahigh extrusion pressure modified into plurality of different molecular weight extrusion-modified starch polymers or starch-based polymers that polymerize when wetted or mixed with room temperature water forming a hydrocolloid gel and protein, preferably kafirin from the sorghum, or proteins, including kafirin from the sorghum, in the at least in the one or more cereal grains, preferably one or more sorghums, more preferably whole grain(s) of the one or more sorghums of the admixture are freed during extrusion at such ultrahigh extrusion pressure and/or are ultrahigh extrusion pressure modified during the one or more cereal grains, preferably one or more sorghums, more preferably whole grain(s) of the one or more sorghums of the admixture being subjected to the aforementioned ultrahigh extrusion pressure for such relatively short residency times such that the freed and/or modified protein(s), preferably freed and/or modified kafirin protein is configured as a crosslinker that crosslinks the polymerized starch polymers or starch-based polymers of the hydrocolloid gel when wetted or mixed with water thereby forming a self-gelling gel. Extrusion under ultrahigh pressure extrusion also modifies or frees protein from the cereal grain(s), preferably sorghum in the admixture thereby advantageously increasing the amount and digestibility of the protein in the resultant gelling food product constituent extrudate produced by extrusion as well as in the extruded gelling food product constituent composed of gelling food product constituent extrudate produced by extrusion.

In addition to the admixture containing starches and proteins from the one or more cereal grains, preferably one or more sorghums, more preferably whole grain(s) of the one or more sorghums, the admixture also contains fiber therefrom that is freed and/or modified by or during extrusion at such aforementioned ultrahigh extrusion pressures at such aforementioned relatively low residency times, with such freed and/or modified fiber substantially uniformly distributed throughout the resultant gelling food product constituent extrudate produced from or by extrusion of the admixture. In addition, still other starch from the one or more cereal grains, preferably one or more sorghums, more preferably whole grain(s) of the one or more sorghums is modified, preferably also physically modified, into resistant starch or resistant starches during or by extrusion at such aforementioned ultrahigh extrusion pressures at such aforementioned relatively low residency times, with such resistant starch or resistant starches also substantially uniformly distributed throughout the resultant gelling food product constituent extrudate produced from or by extrusion of the admixture. As a result of the gelling food product constituent extrudate containing such freed and/or modified fiber from the as well as any ultrahigh extrusion pressure modified resistant starch or starches, which are uniformly distributed throughout the extrudate, any granules or pellets of the extrudate, as well as any grits, powder or flour comminuted therefrom, the resultant gel or food emulsion formed of the gel possesses greater stability and has a longer shelf life without other ingredients of a food product made therewith settling out or precipitating as a result of the fiber and/or resistant starch forming a gel matrix. This gel matrix formed by this fiber and/or resistant starch advantageously holds the other ingredients and helps retain the gel in place thereby enhancing the structural stability of the gel or food emulsion formed of the at least one and preferably the plurality of other ingredients and the gelling food product constituent extrudate or extruded gelling food product constituent composed of the gelling food product constituent extrudate. A gel or food emulsion formed of at least one other ingredient, preferably of at least a plurality of other ingredients, more preferably at least a plurality of pairs, i.e., at least three, of other ingredients, along with the gelling food product constituent extrudate or extruded gelling food product constituent composed of the gelling food product constituent extrudate as still another one of the food product ingredients advantageously produces a shelf-stable gel or shelf-stable food emulsion when mixed with water using a mixer that preferably is high shear mixer that has a shelf life of at least 6 months, preferably at least one year, and more preferably at least eighteen months without any of the ingredients settling or precipitating out.

In a second preferred method and embodiment, the starch-containing admixture is composed of at least 30%, preferably at least 50%, more preferably at least 65% and even more preferably substantially completely composed of one or more legumes, preferably one or more pulses, more preferably whole grain(s) of one or more legumes or pulses, even more preferably whole grain(s) of chickpea, yellow pea and/or pea extruded in an extruder that preferably is a single screw extruder at such ultrahigh extrusion pressures and relatively short residency times as disclosed above forms a dual-component gelling food product constituent extrudate composed of (a) cold water soluble ultrahigh extrusion pressure modified starch gellant, and (b) pregelatinized starch formed of ultrahigh pressure extrusion modified starch that preferably is comminuted into granules or pellets by a rotary knife upon extrusion from the extruder die, cooled and dried, without heating, using turbulently flowing room temperature air before being further comminuted into smaller more finely sized particles having a size of (a) grits whose comminuted particles pass through a 1.19 mm sieve (US No. 14 mesh sieve) and ride on a 0.016 inch sieve (US Standard Mesh No. 40 mesh sieve), preferably pass through a 1.19 mm sieve (US Standard Mesh No. 14 mesh sieve) and ride on a 0.01 inch sieve (US No. 60 mesh sieve), (b) powder whose comminuted particles pass through a 297-μm sieve (US Standard Mesh No. 50 mesh sieve), or (c) flour where at least 80%, preferably at least 90%, more preferably at least 98% of its comminuted particles pass through a 212-μm sieve (US Standard Mesh No. 70 mesh sieve). In at least one method and embodiment, starch or starches in the one or more starch-containing legumes, preferably the one or more pulses, more preferably the whole grain(s) of the one or more legumes or pulses, even more preferably the whole grain(s) of chickpea, yellow pea and/or pea of the admixture are ultrahigh extrusion pressure modified into plurality of different molecular weight extrusion-modified starch polymers or starch-based polymers that polymerize when wetted or mixed with room temperature water forming a hydrocolloid gel.

In at least one such method and embodiment, starch or starches in the one or more starch-containing legumes, preferably the one or more pulses, more preferably the whole grain(s) of the one or more legumes or pulses, even more preferably the whole grain(s) of chickpea, yellow pea and/or pea of the admixture are ultrahigh extrusion pressure modified into plurality of different molecular weight extrusion-modified starch polymers or starch-based polymers that polymerize when wetted or mixed with room temperature water forming a hydrocolloid gel and protein, preferably one or more of albumins, globulins, glutelins, prolamines, or other proteins, including albumins, globulins, glutelins, prolamines, in the at least in the one or more starch-containing legumes, preferably the one or more pulses, more preferably the whole grain(s) of the one or more legumes or pulses, even more preferably the whole grain(s) of chickpea, yellow pea and/or pea of the admixture are freed during extrusion at such ultrahigh extrusion pressure and/or are ultrahigh extrusion pressure modified during the one or more starch-containing legumes, preferably the one or more pulses, more preferably the whole grain(s) of the one or more legumes or pulses, even more preferably the whole grain(s) of chickpea, yellow pea and/or pea of the admixture being subjected to the aforementioned ultrahigh extrusion pressure for such relatively short residency times such that the freed and/or modified protein(s), preferably freed and/or modified protein therefrom is configured as a crosslinker that crosslinks the polymerized starch polymers or starch-based polymers of the hydrocolloid gel when wetted or mixed with water thereby forming a self-gelling gel. Extrusion under ultrahigh pressure extrusion also modifies or frees protein from the legume(s), pulse(s), preferably chickpea, yellow pea and/or pea in the admixture thereby advantageously increasing the amount and digestibility of the protein in the resultant gelling food product constituent extrudate produced by extrusion as well as in the extruded gelling food product constituent composed of gelling food product constituent extrudate produced by extrusion.

In addition to the admixture containing starches and proteins from the one or more starch-containing legumes, preferably the one or more pulses, more preferably the whole grain(s) of the one or more legumes or pulses, even more preferably the whole grain(s) of chickpea, yellow pea and/or pea, the admixture also contains fiber therefrom that is freed and/or modified by or during extrusion at such aforementioned ultrahigh extrusion pressures at such aforementioned relatively low residency times, with such freed and/or modified fiber substantially uniformly distributed throughout the resultant gelling food product constituent extrudate produced from or by extrusion of the admixture. In addition, still other starch from the one or more starch-containing legumes, preferably the one or more pulses, more preferably the whole grain(s) of the one or more legumes or pulses, even more preferably the whole grain(s) of chickpea, yellow pea and/or pea is modified, preferably also physically modified, into resistant starch or resistant starches during or by extrusion at such aforementioned ultrahigh extrusion pressures at such aforementioned relatively low residency times, with such resistant starch or resistant starches also substantially uniformly distributed throughout the resultant gelling food product constituent extrudate produced from or by extrusion of the admixture. As a result of the gelling food product constituent extrudate containing such freed and/or modified fiber from the as well as any ultrahigh extrusion pressure modified resistant starch or starches, which are uniformly distributed throughout the extrudate, any granules or pellets of the extrudate, as well as any grits, powder or flour comminuted therefrom, the resultant gel or food emulsion formed of the gel possesses greater stability and has a longer shelf life without other ingredients of a food product made therewith settling out or precipitating as a result of the fiber and/or resistant starch forming a gel matrix. This gel matrix formed by this fiber and/or resistant starch advantageously holds the other ingredients and helps retain the gel in place thereby enhancing the structural stability of the gel or food emulsion formed of the at least one and preferably the plurality of other ingredients and the gelling food product constituent extrudate or extruded gelling food product constituent composed of the gelling food product constituent extrudate. A gel or food emulsion formed of at least one other ingredient, preferably of at least a plurality of other ingredients, more preferably at least a plurality of pairs, i.e., at least three, of other ingredients, along with the gelling food product constituent extrudate or extruded gelling food product constituent composed of the gelling food product constituent extrudate as still another one of the food product ingredients advantageously produces a shelf-stable gel or shelf-stable food emulsion when mixed with water using a mixer that preferably is high shear mixer that has a shelf life of at least 6 months, preferably at least one year, and more preferably at least eighteen months without any of the ingredients settling or precipitating out.

In a preferred embodiment, the gelling food product extrudate produced from extruding one of chickpea, preferably whole grain or whole seed chickpea, yellow pea, preferably whole grain or whole seed yellow pea, under ultrahigh pressure extrusion using a single screw extruder contains extrusion-modified pregelatinized starch that gels and forms a gel component when the gelling extrudate is wetted with water mixed thoroughly therewith using a high shear mixer, and has a self-gelling gel component that forms a gel when the gelling extrudate is wetted with water mixed thoroughly therewith using a high shear mixer that preferably is a thermo-reversible gel. In such a preferred gelling food product extrudate, protein in the admixture is freed or modified during ultrahigh pressure extrusion crosslinks with starch modified during ultrahigh extrusion pressure extrusion into a plurality of different molecular weight starch polymers or starch-based polymers that polymerize when wetted with water to form a gel. The modified or freed proteins serve as a crosslinker or crosslinking agent that crosslinks the extrusion-modified starch polymers or starch-based polymers when wetted with water and mixed therewith using a high shear mixer. Such a gelling extrudate preferably is a self-gelling extrudate that absorbs at least four times water, preferably at least six times its weight in water, and more preferably absorbs at least eight times its weight in water and provides at least four times the thickening potency of cornstarch when wetted with water, preferably at least six times the thickening potency of cornstarch when wetted with water, and more preferably at least eight times the thickening potency of cornstarch when wetted with water. In a method of controlling viscosity, the ratio of water to gelling preferably self-gelling extrudate provides viscosity control of the resultant gel produced after wetting and high shear mixing with water with less water increasing viscosity up to a point beyond where the amount of water causes pasting and decreasing the viscosity as more water is used. In one preferred viscosity control method and embodiment, an equal ratio of water to gelling or self-gelling extrudate produces a gel, preferably a self-gelling gel, which has its highest or greatest viscosity with adding less water than what produces the highest or greatest viscosity increasing the amount of paste or paste present and adding more water than what produces the highest or greatest viscosity decreasing viscosity therefrom.

DETAILED DESCRIPTION OF THE INVENTION

I. In General

Before the present materials and methods are described, it is understood that this invention is not limited to the particular methodology, protocols, materials, and reagents described, as these may vary. It is also to be understood that the terminology used herein is for the purpose of describing particular embodiments only and is not intended to limit the scope of the present invention, which will be limited only by the appended claims.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein are incorporated by reference for all purposes including describing and disclosing the ingredients, reagents, chemicals, devices, manufactures, statistical analysis and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

II. The Invention

The present invention is directed to an extruded gelling food product constituent that is composed of a gelling food product constituent extrudate extruded from a starch-containing admixture subjected to sufficiently high extrusion pressures and extrusion conditions within an extruder to modify, preferably physically modify, starch in the admixture into a water-soluble extrusion-modified starch gellant that gels and/or forms a gel when wetted with water, thereby configuring the gelling food product constituent extrudate and extruded gelling food product constituent composed of the gelling food product constituent extrudate to gel and/or form a gel when wetted with water. As discussed in more detail below, in one preferred embodiment, other starch of the starch-containing admixture is modified, preferably also physically modified, by the high extrusion pressure and extrusion conditions within the extruder such that pregelatinized starch also is formed in the gelling food product constituent extrudate producing an extruded gelling food product constituent in accordance with the present invention configured with two-component gelling, with one gelling component provided by the water-soluble extrusion-modified starch gellant in the gelling food product constituent extrudate, and the other gelling component provided by the water-soluble pregelatinized starch in the gelling food product constituent extrudate. As discussed herein in more detail, the resultant extruded gelling food product constituent is comminuted into relatively small particles sizes having the size of grits, powder or flour for use as a food product ingredient. Where the extruded gelling food product constituent is solely composed of gelling food product constituent extrudate and contains no other constituents, the gelling food product constituent extrudate is comminuted during extrusion into pellets or granules that are further comminuted by grinding or milling into smaller sized particles having the size of grits, powder or preferably flour used as a food product ingredient.

In one preferred embodiment, the extrusion pressures and extrusion conditions within the extruder modify some of the starch in the starch-containing admixture into a plurality of different molecular weight extrusion-modified starch polymers or starch-based polymers that form the water-soluble extrusion-modified starch gellant that polymerize into a hydrocolloid gel when wetted with and preferably mixed with water. In another preferred embodiment, the extrusion pressures and extrusion conditions within the extruder also modify and/or free up some of the protein or proteins in the starch-containing admixture into a crosslinker that forms part of the water-soluble extrusion-modified starch gellant that crosslinks the plurality of different molecular weight starch polymers or starch-based polymers of the gellant when wetted with and preferably mixed with water. In one such preferred embodiment where the water-soluble extrusion-modified starch gellant contains both (a) extrusion-modified starch or starches that forms a plurality of different molecular weight extrusion-modified starch polymers or different molecular weight extrusion-modified starch-based polymers, and (b) extrusion-modified or extrusion-freed protein or proteins that crosslink the different molecular weight extrusion-modified starch polymers or different molecular weight extrusion-modified starch-based polymers when an extruded gelling food product constituent composed of food product constituent extrudate containing such an extrusion-modified starch polymer and protein crosslinker starch gellant is wetted with water, the resultant self-gelling gel formed preferably is a thermoreversible gel.

In a preferred embodiment, the water-soluble extrusion-modified starch gellant is a cold-water soluble hydrocolloid when wetted with room temperature water mixed therewith that forms a gel, preferably a self-gelling gel, which is thermally stable, and which preferably produces thermally and shelf-life stable food emulsions when used as an ingredient of a food product. In one such preferred embodiment, the extruded gelling food product constituent is composed of gelling food product constituent extrudate that not only contains water-soluble extrusion-modified starch gellant but also contains pregelatinized starch formed of other starch in the admixture modified, preferably also physically modified by extrusion pressure during extrusion in pregelatinized starch, which also gels when wetted with water mixed therewith producing a dual-gelling component gelling food product constituent extrudate containing one gelling component, namely water-soluble extrusion-modified starch gellant that gels when wetted, but also a second gelling component, namely pregelatinized starch that also gels when wetted.

A preferred embodiment of an extruded gelling food product constituent of the present invention is composed of water-soluble extrusion-modified starch gellant that is cold water soluble that gels and preferably forms a gel when wetted with water that is mixed therewith, preferably using a mixer that more preferably is a high shear mixer, that is a conventional gum substitute or conventional gum replacement that more preferably is a guar gum replacement or guar gum substitute that replaces guar gum as an ingredient of a food product. In another preferred embodiment, extruded gelling food product constituent is composed of gelling food product constituent extrudate containing water-soluble extrusion-modified starch gellant and which is configured to be a conventional gum substitute or conventional gum replacement that replaces or substitutes for at least one of xanthan gum and carrageenan as an ingredient of a food product that would ordinarily require one or more such conventional gums. In another preferred embodiment, the extruded gelling food product constituent composed of gelling food product constituent extrudate containing water-soluble extrusion-modified starch gellant configured for use as at least one or both of the aforementioned conventional gum substitutes or replacements is also composed of a second gelling component in the form of pregelatinized starch formed from other starch modified during extrusion as discussed in more detail above and elsewhere herein.

A preferred embodiment of an extruded gelling food product constituent is composed of gelling food product constituent extrudate that configures the extruded gelling food product constituent to be used as an ingredient in one or more of the different types of the above-identified non-dairy dairy substitute or dairy alternative food products as discussed in more detail hereinbelow. In one such preferred embodiment, the extruded gelling food product constituent is composed of gelling food product constituent extrudate that configures the extruded gelling food product constituent to be used as an ingredient that is a replacement or substitute for one or more conventional gum(s) used in one or more of the different types of the above-identified non-dairy dairy substitute or dairy alternative food products. In another such preferred embodiment, the extruded gelling food product constituent is composed of gelling food product constituent extrudate that configures the extruded gelling food product constituent that is a gum replacement or gum substitute that at least partially and preferably completely replaces at least one conventional gum, preferably more than one conventional gum, and preferably all of the conventional gums previously used in at least one of the one or more of the different types of the above-identified non-dairy dairy substitute or dairy alternative food products. In at least one preferred embodiment, the extruded gelling food product constituent composed of gelling food product constituent extrudate containing water-soluble extrusion-modified starch gellant configured for use as an ingredient in one or more of the aforementioned non-dairy dairy substitute or dairy alternative food products is also composed of a second gelling component in the form of pregelatinized starch formed from other starch modified during extrusion as discussed in more detail above and elsewhere herein.

Another preferred embodiment of an extruded gelling food product constituent is composed of gelling food product constituent extrudate that configures the extruded gelling food product constituent to be used as an ingredient in one or more of the different types of the above-identified meatless meat-substitute food products also discussed in more detail hereinbelow. In another such preferred embodiment, the extruded gelling food product constituent is composed of gelling food product constituent extrudate that configures the extruded gelling food product constituent to be used as an ingredient that is a replacement or substitute for one or more conventional gum(s) used in one or more of the different types of the above-identified meatless meat-substitute food products. In at least one preferred embodiment, the extruded gelling food product constituent composed of gelling food product constituent extrudate containing water-soluble extrusion-modified starch gellant configured for use as an ingredient in one or more of the aforementioned meatless meat-substitute food products is also composed of a second gelling component in the form of pregelatinized starch formed from other starch modified during extrusion as discussed in more detail above and elsewhere herein. In at least one such gum-replacement embodiment, the extruded gelling food product constituent composed of gelling food product constituent extrudate containing water-soluble extrusion-modified starch gellant configured for use as a gum-replacement ingredient in a food product is also composed of a second gelling component in the form of pregelatinized starch formed from other starch modified during extrusion as discussed in more detail above and elsewhere herein.

Such an extruded gelling food product constituent is composed of a gelling food product constituent extrudate of the present invention configured for the extruded gelling food product constituent to be used as a food product ingredient that is at least one of (a) a gelling agent, preferably a conventional gum substitute, (b) a thickener or thickening agent, preferably to thicken soups, porridges, sauces, dressings, creams, and puddings, (c) an emulsifier or emulsifying agent, preferably used to make food emulsions, (d) a humectant, to retain or absorb moisture in a food product, and/or (e) stabilizer or stabilizing agent, to prevent separation in emulsions used in dressings, and/or preventing ice crystal formation in ice cream. In one preferred embodiment, the gelling food product constituent extrudate configures the extruded gelling food product constituent as a food product ingredient that is at least a plurality of (a)-(e) with the extruded gelling food product constituent being used as one of (a)-(e) when used as an ingredient in one type of food product and being used as a different one of (a)-(e) when used as an ingredient in a different type of food product. In another preferred embodiment, the gelling food product constituent extrudate is configured such that the extruded gelling food product constituent is a food product ingredient that is at least a plurality of pairs, i.e., at least three, of (a)-(e), with it being used as a first one of (a)-(e) when used as an ingredient in a first type of food product, being used as a second one of (a)-(e) when used as an ingredient in a second type of food product, and being used as a third one of (a)-(e) when used as an ingredient in a third type of food product. In at least one such embodiment of a gelling agent, thickening agent, emulsifier humectant and/or stabilizer, the extruded gelling food product constituent composed of gelling food product constituent extrudate containing water-soluble extrusion-modified starch gellant configured for use as one or more of a gelling agent, thickening agent, emulsifier humectant and/or stabilizer in a food product is also composed of a second gelling component in the form of pregelatinized starch formed from other starch modified during extrusion as discussed in more detail above and elsewhere herein.

In a method of making an extruded gelling food product constituent in accordance with the present invention, an admixture composed of at least 10%, preferably at least 15%, and more preferably at least 25% starch having a moisture content no greater than 25%, preferably no greater than 20%, more preferably no greater than about 17%±2%, is extruded using an extruder that preferably is a single screw extruder at an extrusion pressure that preferably is an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder, which modifies, preferably physically modifies at least some of the starch in the admixture into a cold water-soluble extrusion-modified starch gellant, before gelling food product constituent extrudate containing the cold water-soluble extrusion-modified starch gellant substantially uniformly distributed throughout the extrudate is discharged through a perforate extrusion die at a discharge end of the extruder. During extrusion, the starch-containing admixture is subjected to an extrusion temperature of at least 100° Celsius and preferably at least 130° Celsius at such ultrahigh extrusion pressures. In order to preserve and freeze the cold water-soluble gelling and/or cold-water soluble gel forming properties of the cold water-soluble extrusion-modified starch gellant substantially uniformly distributed throughout the gelling food product constituent extrudate, the gelling food product constituent extrudate is cooled and dried after the gelling food product constituent extrudate exits the extrusion die in a manner that cools and dries the extrudate so without the application of any heat to the extrudate.

In at least one preferred method of making an extruded gelling food product constituent and/or method of extruding gelling food product constituent extrudate, any of the starch-containing admixtures disclosed herein can be and preferably are extruded at an ultrahigh extrusion pressure of at least 7,500 PSI, can be and preferably is extruded in at least one method at an extrusion pressure of at least 10,000 PSI, and in at least one other method is extruded at an extrusion pressure of at least 15,000 PSI. In yet another method of making extruded gelling food product constituent and/or extruding gelling food product constituent extrudate, any of the starch-containing admixtures disclosed herein can be extruded and preferably are extruded at an extrusion pressure of at least 20,000 PSI.

In a preferred method, the gelling food product constituent extrudate is comminuted into pellets or granules upon being discharged from the extrusion die, such as by a high speed rotary knife, which is then cooled and dried, without being heated, by turbulently flowing air, preferably room temperature turbulently flowing air that has a temperature of about 68° Fahrenheit±12 degrees Fahrenheit, which turbulently flowing air also used to transport the pellets or granules of the gelling food product constituent extrudate away from the extruder. In one such preferred method, the turbulently flowing room temperature air has a low enough temperature and a high enough volumetric flow rate of at least 300 cubic feet per minute, preferably at least 500 cubic feet per minute, and more preferably at least 800 cubic feet minute when flowing from a generally airtightly sealed knife cage enclosing the extruder die at the discharge end of the extruder through an elongate duct of a pneumatic conveyor to both cool and dry the pellets or granules of the gelling food product constituent extrudate the entire time being transported through the duct thereby (a) reducing the temperature of the pellets or granules of the gelling food product constituent extrudate by at least 30° Fahrenheit, preferably at least 40° Fahrenheit, and more preferably at least 50° Fahrenheit from the temperature at which the extrudate exited the extrusion die, and (b) reducing the moisture content of the pellets or granules of the gelling food product constituent extrudate by at least 3% by pellet or granule weight, preferably at least 4% by pellet or granule weight, and more preferably at least 5% by pellet or granule weight from the moisture content of the extrudate exiting the extrusion die. In one such preferred embodiment, such a cooling and drying without heating step using such turbulently flowing air dries the pellets or granules of gelling food product constituent extrudate to a moisture content of between 3% and 12% moisture content by pellet weight, preferably between 4% and 10% moisture content by pellet weight, and more preferably between 5% and 8% moisture content by pellet weight.

In a preferred method of making gelling food product constituent extrudate of the present invention, the aforementioned ultrahigh extrusion pressures and extruder parameters are configured or further configured to modify, preferably physically modify, other starch or other starches in the starch-containing admixture into a cold water soluble pregelatinized starch contained in the gelling food product constituent extrudate extruded from the extruder that also gels when wetted and preferably mixed with water thereby forming a dual gelling component gelling food product constituent extrudate of another preferred extruded gelling food product constituent embodiment of the present invention. As previously discussed, such a dual gelling component extrudate contains both cold water soluble pregelatinized starch and cold water-soluble extrusion-modified starch gellant with the pregelatinized starch component gelling and preferably forming a starch-type gel of starch in suspension, and the extrusion-modified starch gellant gelling and preferably forming a hydrocolloid gel that preferably is in the form of a temperature stable and physically stable emulsion, preferably food emulsion, when wetted with water and more preferably thoroughly mixed with water using a mixer that preferably is a high-shear mixer or the like.

In one preferred single gelling component or dual gelling component embodiment, starches in the starch-containing admixture are modified during ultrahigh pressure extrusion using an extruder that preferably is a single screw extruder subjecting starches in the starch-containing admixture to an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder thereby ultrahigh pressure extrusion modifying, preferably physically modifying, starch or starches in the admixture into a plurality of different molecular weight extrusion-modified starch polymers or starch-based polymers that form the water-soluble extrusion-modified starch gellant that polymerize into a hydrocolloid gel when wetted with water and preferably when a granular extruded gelling food product constituent composed of gelling food product constituent extrudate containing the plurality of different molecular weight extrusion-modified starch polymers or starch-based polymers is mixed with water using a mixer that preferably is a high shear mixer. As previously discussed, other starches in the starch-containing admixture can be and preferably are modified, preferably physically modified, into pregelatinized starch that forms the second gelling component of a dual gelling component gelling food product constituent extrudate of a dual gelling component extruded gelling food product constituent of the present invention.

In another preferred single gelling component or dual gelling component embodiment, the above starch-containing admixture also contains protein or proteins that together with the starch or starches in the admixture are subjected ultrahigh pressure extrusion in an extruder that preferably is a single screw extruder at an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder ultrahigh pressure extrusion modifying, preferably physically modifying, (a) starch or starches in the admixture into a plurality of different molecular weight extrusion-modified starch polymers or starch-based polymers that form the water-soluble extrusion-modified starch gellant that polymerize into a hydrocolloid gel when wetted with water, and (b) protein or proteins in the admixture into a crosslinker in the gellant that crosslink the plurality of different molecular weight extrusion-modified starch polymers or starch-based polymers that polymerize when wetted and preferably mixed with water preferably forming a self-gelling hydrocolloid gel. In still another preferred single gelling component or dual gelling component embodiment, the starch-containing admixture also contains protein or proteins that together with the starch or starches in the admixture are subjected ultrahigh pressure extrusion in an extruder that preferably is a single screw extruder at an ultrahigh extrusion pressure of at least 2000 PSI, preferably at least 3000 PSI, more preferably at least 4000 PSI, and even more preferably at least 5000 PSI, for a relatively short residency time of no more than 30 seconds, preferably no more than 20 seconds, more preferably no more than 10 seconds, and even more preferably no more than about 7 seconds±1 second within the extruder ultrahigh pressure extrusion modifying, preferably physically modifying, starch or starches in the admixture into a plurality of different molecular weight extrusion-modified starch polymers or starch-based polymers that form the water-soluble extrusion-modified starch gellant that polymerize into a hydrocolloid gel when wetted with water, and (a) modifying, preferably physically modifying protein or proteins in the admixture into a crosslinker in the gellant that cros slink the plurality of different molecular weight extrusion-modified starch polymers or starch-based polymers that polymerize when wetted and preferably mixed with water preferably forming a self-gelling hydrocolloid gel, and/or (b) freeing protein or proteins in the admixture to function as a crosslinker in the gellant that crosslink the plurality of different molecular weight extrusion-modified starch polymers or starch-based polymers that polymerize when wetted and preferably mixed with water preferably forming a self-gelling hydrocolloid gel. As previously discussed, other starches in the starch-containing admixture can be and preferably are modified, preferably physically modified, into pregelatinized starch that forms the second gelling component of a dual gelling component gelling food product constituent extrudate of a dual gelling component extruded gelling food product constituent of the present invention.

In one or more or all of the preferred methods disclosed hereinabove, the cold water-soluble extrusion-modified starch gellant is substantially uniformly distributed throughout the gelling food product constituent extrudate so as to homogenously impart its gelling properties and ability to form a gel, preferably a hydrocolloid gel, more preferably a self-gelling hydrocolloid gel, and even more preferably a thermoreversible self-gelling hydrocolloid gel throughout the gelling food product constituent extrudate and extruded gelling food product constituent composed of the extruded gelling food product constituent. Where the extruded gelling food product constituent and gelling food product constituent extrudate is a dual gelling component extruded gelling food product constituent and dual gelling component gelling food product constituent extrudate, both the cold water soluble pregelatinized starch and the cold water-soluble extrusion-modified starch gellant are respectively substantially uniformly distributed throughout the gelling food product constituent extrudate so as to impart their respective gelling properties and their respective ability to form their two different types of gel are also substantially uniformly distributed throughout the dual gelling component extruded gelling extruded food product constituent and dual gelling component gelling extruded food product constituent extrudate. The single component and dual component gelling food product constituent extrudate respectively composed of single component gelling food product constituent extrudate and dual component gelling food product constituent extrudate are comminuted, preferably by grinding or milling into smaller more finely sized particles preferably having the consistency of powder or flour. As a result of being substantially uniformly throughout the extrudate and preferably the constituent composed of extrudate, only a small amount of the powdered or flour single component or dual component extruded food product constituent or gelling food product constituent extrudate needs to be added as a functional gelling, thickening, emulsifying, humectant or stabilizing ingredient of a food product, typically less than 30% by weight of the food product, preferably no more than 15% by weight of the food product, more preferably no more than 10% by weight of the food product, and even more preferably no more than about 5%±2.5% by weight of the food product.

In a preferred method and embodiment, the cold water-soluble extrusion-modified starch gellant is present at a great enough weight percent of at least five percent, preferably at least ten percent, more preferably at least fifteen percent, within the resultant gelling food product constituent extrudate that imparts a gelling property throughout the entire extrudate and extruded food product constituent composed of the gelling extrudate when wetted with water mixed uniformly using a mixer that preferably is a high shear mixer. In another preferred method and embodiment where the gelling food product constituent extrudate is a dual-gelling component extrudate, (a) the cold water-soluble extrusion-modified starch gellant is present at a great enough weight percent of at least five percent, preferably at least ten percent, more preferably at least fifteen percent, within the resultant gelling food product constituent extrudate, and (b) the cold water-soluble extrusion-modified starch pregelatinized starch is present at a great enough weight percent of at least five percent, preferably at least ten percent, more preferably at least fifteen percent, within the resultant gelling food product constituent extrudate, whereby both gelling components synergistically impart a gelling property throughout the entire extrudate and extruded food product constituent composed of the gelling extrudate when wetted with water mixed uniformly therewith using a mixer that preferably is a high shear mixer.

In a preferred method and embodiment, the starch-containing admixture is composed of at least 30%, preferably at least 50%, more preferably at least 65%, even more preferably at least 80%, and still even more preferably substantially completely composed of one or more cereal grains, preferably one or more sorghums, more preferably whole grain(s) of one or more sorghums, extruded in an extruder that preferably is a single screw extruder at such ultrahigh extrusion pressures and relatively short residency times as disclosed above forms a dual-component gelling food product constituent extrudate composed of (a) cold water soluble ultrahigh extrusion pressure modified starch gellant, and (b) pregelatinized starch formed of ultrahigh pressure extrusion modified starch that preferably is comminuted into granules or pellets by a rotary knife upon extrusion from the extruder die, cooled and dried, without heating, using turbulently flowing room temperature air before being further comminuted into smaller more finely sized particles having a size of (a) grits whose comminuted particles pass through a 1.19 mm sieve (US No. 14 mesh sieve) and ride on a 0.016 inch sieve (US Standard Mesh No. 40 mesh sieve), preferably pass through a 1.19 mm sieve (US Standard Mesh No. 14 mesh sieve) and ride on a 0.01 inch sieve (US No. 60 mesh sieve), (b) powder whose comminuted particles pass through a 297-µm sieve (US Standard Mesh No. 50 mesh sieve), or (c) flour where at least 80%, preferably at least 90%, more preferably at least 98% of its comminuted particles pass through a 212-µm sieve (US Standard Mesh No. 70 mesh sieve). In at least one method and embodiment, starch or starches in the one or more cereal grains, preferably one or more sorghums, more preferably whole grain(s) of the one or more sorghums of the admixture are ultrahigh extrusion pressure modified into plurality of different molecular weight extrusion-modified starch polymers or starch-based polymers that polymerize when wetted or mixed with room temperature water forming a hydrocolloid gel. In at least one such method and embodiment, starch or starches in the one or more cereal grains, preferably one or more sorghums, more preferably whole grain(s) of the one or more sorghums of the admixture are ultrahigh extrusion pressure modified into plurality of different molecular weight extrusion-modified starch polymers or starch-based polymers that polymerize when wetted or mixed with room temperature water forming a hydrocolloid gel and protein, preferably kafirin from the sorghum, or proteins, including kafirin from the sorghum, in the at least in the one or more cereal grains, preferably one or more sorghums, more preferably whole grain(s) of the one or more sorghums of the admixture are freed during extrusion at such ultrahigh extrusion pressure and/or are ultrahigh extrusion pressure modified during the one or more cereal grains, preferably one or more sorghums, more preferably whole grain(s) of the one or more sorghums of the admixture being subjected to the aforementioned ultrahigh extrusion pressure for such relatively short residency times such that the freed and/or modified protein(s), preferably freed and/or modified kafirin protein is configured as a crosslinker that crosslinks the polymerized starch polymers or starch-based polymers of the hydrocolloid gel when wetted or mixed with water thereby forming a self-gelling gel. Extrusion under ultrahigh pressure extrusion also modifies or frees protein from the cereal grain(s), preferably sorghum in the admixture thereby advantageously increasing the amount and digestibility of the protein in the resultant gelling food product constituent extrudate produced by extrusion as well as in the extruded gelling food product constituent composed of gelling food product constituent extrudate produced by extrusion.

In addition to the admixture containing starches and proteins from the one or more cereal grains, preferably one or more sorghums, more preferably whole grain(s) of the one or more sorghums, the admixture also contains fiber therefrom that is freed and/or modified by or during extrusion at such aforementioned ultrahigh extrusion pressures at such aforementioned relatively low residency times, with such freed and/or modified fiber substantially uniformly distributed throughout the resultant gelling food product constituent extrudate produced from or by extrusion of the admixture. In addition, still other starch from the one or more cereal grains, preferably one or more sorghums, more preferably whole grain(s) of the one or more sorghums is modified, preferably also physically modified, into resistant starch or resistant starches during or by extrusion at such aforementioned ultrahigh extrusion pressures at such aforementioned relatively low residency times, with such resistant starch or resistant starches also substantially uniformly distributed throughout the resultant gelling food product constituent extrudate produced from or by extrusion of the admixture. As a result of the gelling food product constituent extrudate containing such freed and/or modified fiber from the as well as any ultrahigh extrusion pressure modified resistant starch or starches, which are uniformly distributed throughout the extrudate, any granules or pellets of the extrudate, as well as any grits, powder or flour comminuted therefrom, the resultant gel or food emulsion formed of the gel possesses greater stability and has a longer shelf life without other ingredients of a food product made therewith settling out or precipitating as a result of the fiber and/or resistant starch forming a gel matrix. This gel matrix formed by this fiber and/or resistant starch advantageously holds the other ingredients and helps retain the gel in place thereby enhancing the structural stability of the gel or food emulsion formed of the at least one and preferably the plurality of other ingredients and the gelling food product constituent extrudate or extruded gelling food product constituent composed of the gelling food product constituent extrudate. A gel or food emulsion formed of at least one other ingredient, preferably of at least a plurality of other ingredients, more preferably at least a plurality of pairs, i.e., at least three, of other ingredients, along with the gelling food product constituent extrudate or extruded gelling food product constituent composed of the gelling food product constituent extrudate as still another one of the food product ingredients advantageously produces a shelf-stable gel or shelf-stable food emulsion when mixed with water using a mixer that preferably is high shear mixer that has a shelf life of at least 6 months, preferably at least one year, and more preferably at least eighteen months without any of the ingredients settling or precipitating out.

In a second preferred method and embodiment, the starch-containing admixture is composed of at least 30%, preferably at least 50%, more preferably at least 65%, even more preferably at least 80%, and still even more preferably substantially completely composed of one or more cereal grains, preferably maize or corn, more preferably whole grain(s) of one or more types of maize or corn, extruded in an extruder that preferably is a single screw extruder at such ultrahigh extrusion pressures and relatively short residency times as disclosed above forms a dual-component gelling food product constituent extrudate composed of (a) cold water soluble ultrahigh extrusion pressure modified starch gellant, and (b) pregelatinized starch formed of ultrahigh pressure extrusion modified starch that preferably is comminuted into granules or pellets by a rotary knife upon extrusion from the extruder die, cooled and dried, without heating, using turbulently flowing room temperature air before being further comminuted into smaller more finely sized particles having a size of (a) grits whose comminuted particles pass through a 1.19 mm sieve (US No. 14 mesh sieve) and ride on a 0.016 inch sieve (US Standard Mesh No. 40 mesh sieve), preferably pass through a 1.19 mm sieve (US Standard Mesh No. 14 mesh sieve) and ride on a 0.01 inch sieve (US No. 60 mesh sieve), (b) powder whose comminuted particles pass through a 297-μm sieve (US Standard Mesh No. 50 mesh sieve), or (c) flour where at least 80%, preferably at least 90%, more preferably at least 98% of its comminuted particles pass through a 212-μm sieve (US Standard Mesh No. 70 mesh sieve). In at least one method and embodiment, starch or starches in the one or more cereal grains, preferably one or more types of maize or corn, more preferably whole grain(s) of the one or more types of maize or corn of the admixture are ultrahigh extrusion pressure modified into plurality of different molecular weight extrusion-modified starch polymers or starch-based polymers that polymerize when wetted or mixed with room temperature water forming a hydrocolloid gel. In at least one such method and embodiment, starch or starches in the one or more cereal grains, preferably one or more types of maize or corn, more preferably whole grain(s) of the one or more types of maize or corn of the admixture are ultrahigh extrusion pressure modified into plurality of different molecular weight extrusion-modified starch polymers or starch-based polymers that polymerize when wetted or mixed with room temperature water forming a hydrocolloid gel and protein, preferably zein from the corn or maize, or proteins, including zein from the corn or maize, in the at least in the one or more cereal grains, preferably one or more types of corn or maize, more preferably whole grain(s) of the one or more types of maize or corn of the admixture are freed during extrusion at such ultrahigh extrusion pressure and/or are ultrahigh extrusion pressure modified during the one or more cereal grains, preferably one or more types of corn, more preferably whole grain(s) of the one or more types of corn of the admixture being subjected to the aforementioned ultrahigh extrusion pressure for such relatively short residency times such that the freed and/or modified protein(s), preferably freed and/or modified zein protein is configured as a crosslinker that crosslinks the polymerized starch polymers or starch-based polymers of the hydrocolloid gel when wetted or mixed with water thereby forming a self-gelling gel. Extrusion under ultrahigh pressure extrusion also modifies or frees protein from the cereal grain(s), preferably corn or maize in the admixture thereby advantageously increasing the amount and digestibility of the protein in the resultant gelling food product constituent extrudate produced by extrusion as well as in the extruded gelling food product constituent composed of gelling food product constituent extrudate produced by extrusion.

In addition to the admixture containing starches and proteins from the one or more cereal grains, preferably one or more types of corn or maize, more preferably whole grain(s) of the one or more types of corn or maize, the admixture also contains fiber therefrom that is freed and/or modified by or during extrusion at such aforementioned ultrahigh extrusion pressures at such aforementioned relatively low residency times, with such freed and/or modified fiber substantially uniformly distributed throughout the resultant gelling food product constituent extrudate produced from or by extrusion of the admixture. In addition, still other starch from the one or more cereal grains, preferably one or more types of corn or maize, more preferably whole grain(s) of the one or more types of corn or maize is modified, preferably also physically modified, into resistant starch or resistant starches during or by extrusion at such aforementioned ultrahigh extrusion pressures at such aforementioned relatively low residency times, with such resistant starch or resistant starches also substantially uniformly distributed throughout the resultant gelling food product constituent extrudate produced from or by extrusion of the admixture. As a result of the gelling food product constituent extrudate containing such freed and/or modified fiber from the corn or maize as well as any ultrahigh extrusion pressure modified resistant starch or starches, which are uniformly distributed throughout the extrudate, any granules or pellets of the extrudate, as well as any grits, powder or flour comminuted therefrom, the resultant gel or food emulsion formed of the gel possesses greater stability and has a longer shelf life without other ingredients of a food product made therewith settling out or precipitating as a result of the fiber and/or resistant starch forming a gel matrix. This gel matrix formed by this fiber and/or resistant starch advantageously holds the other ingredients and helps retain the gel in place thereby enhancing the structural stability of the gel or food emulsion formed of the at least one and preferably the plurality of other ingredients and the gelling food product constituent extrudate or extruded gelling food product constituent composed of the gelling food product constituent extrudate. A gel or food emulsion formed of at least one other ingredient, preferably of at least a plurality of other ingredients, more preferably at least a plurality of pairs, i.e., at least three, of other ingredients, along with the gelling food product constituent extrudate or extruded gelling food product constituent composed of the gelling food product constituent extrudate as still another one of the food product ingredients advantageously produces a shelf-stable gel or shelf-stable food emulsion when mixed with water using a mixer that preferably is high shear mixer that has a shelf life of at least 6 months, preferably at least one year, and more preferably at least eighteen months without any of the ingredients settling or precipitating out.

In a third preferred method and embodiment, the starch-containing admixture is composed of at least 30%, preferably at least 50%, more preferably at least 65%, even more preferably at least 80%, and still even more preferably substantially completely composed of one or more legumes, preferably one or more pulses, more preferably whole grain(s) of one or more legumes or pulses, even more preferably whole grain(s) of chickpea, yellow pea and/or pea extruded in an extruder that preferably is a single screw extruder at such ultrahigh extrusion pressures and relatively short residency times as disclosed above forms a dual-component gelling food product constituent extrudate composed of (a) cold water soluble ultrahigh extrusion pressure modified starch gellant, and (b) pregelatinized starch formed of ultrahigh pressure extrusion modified starch that preferably is comminuted into granules or pellets by a rotary knife upon extrusion from the extruder die, cooled and dried, without heating, using turbulently flowing room temperature air before being further comminuted into smaller more finely sized particles having a size of (a) grits whose comminuted particles pass through a 1.19 mm sieve (US No. 14 mesh sieve) and ride on a 0.016 inch sieve (US Standard Mesh No. 40 mesh sieve), preferably pass through a 1.19 mm sieve (US Standard Mesh No. 14 mesh sieve) and ride on a 0.01 inch sieve (US No. 60 mesh sieve), (b) powder whose comminuted particles pass through a 297-µm sieve (US Standard Mesh No. 50 mesh sieve), or (c) flour where at least 80%, preferably at least 90%, more preferably at least 98% of its comminuted particles pass through a 212-µm sieve (US Standard Mesh No. 70 mesh sieve). In at least one method and embodiment, starch or starches in the one or more starch-containing legumes, preferably the one or more pulses, more preferably the whole grain(s) of the one or more legumes or pulses, even more preferably the whole grain(s) of chickpea, yellow pea and/or pea of the admixture are ultrahigh extrusion pressure modified into plurality of different molecular weight extrusion-modified starch polymers or starch-based polymers that polymerize when wetted or mixed with room temperature water forming a hydrocolloid gel.

In at least one such method and embodiment, starch or starches in the one or more starch-containing legumes, preferably the one or more pulses, more preferably the whole grain(s) of the one or more legumes or pulses, even more preferably the whole grain(s) of chickpea, yellow pea and/or pea of the admixture are ultrahigh extrusion pressure modified into plurality of different molecular weight extrusion-modified starch polymers or starch-based polymers that polymerize when wetted or mixed with room temperature water forming a hydrocolloid gel and protein, preferably one or more of albumins, globulins, glutelins, prolamines, or other proteins, including albumins, globulins, glutelins, prolamines, in the at least in the one or more starch-containing legumes, preferably the one or more pulses, more preferably the whole grain(s) of the one or more legumes or pulses, even more preferably the whole grain(s) of chickpea, yellow pea and/or pea of the admixture are freed during extrusion at such ultrahigh extrusion pressure and/or are ultrahigh extrusion pressure modified during the one or more starch-containing legumes, preferably the one or more pulses, more preferably the whole grain(s) of the one or more legumes or pulses, even more preferably the whole grain(s) of chickpea, yellow pea and/or pea of the admixture being subjected to the aforementioned ultrahigh extrusion pressure for such relatively short residency times such that the freed and/or modified protein(s), preferably freed and/or modified protein therefrom is configured as a crosslinker that crosslinks the polymerized starch polymers or starch-based polymers of the hydrocolloid gel when wetted or mixed with water thereby forming a self-gelling gel. Extrusion under ultrahigh pressure extrusion also modifies or frees protein from the legume(s), pulse(s), preferably chickpea, yellow pea and/or pea in the admixture thereby advantageously increasing the amount and digestibility of the protein in the resultant gelling food product constituent extrudate produced by extrusion as well as in the extruded gelling food product constituent composed of gelling food product constituent extrudate produced by extrusion.

In addition to the admixture containing starches and proteins from the one or more starch-containing legumes, preferably the one or more pulses, more preferably the whole grain(s) of the one or more legumes or pulses, even more preferably the whole grain(s) of chickpea, yellow pea and/or pea, the admixture also contains fiber therefrom that is freed and/or modified by or during extrusion at such aforementioned ultrahigh extrusion pressures at such aforementioned relatively low residency times, with such freed and/or modified fiber substantially uniformly distributed throughout the resultant gelling food product constituent extrudate produced from or by extrusion of the admixture. In addition, still other starch from the one or more starch-containing legumes, preferably the one or more pulses, more preferably the whole grain(s) of the one or more legumes or pulses, even more preferably the whole grain(s) of chickpea, yellow pea and/or pea is modified, preferably also physically modified, into resistant starch or resistant starches during or by extrusion at such aforementioned ultrahigh extrusion pressures at such aforementioned relatively low residency times, with such resistant starch or resistant starches also substantially uniformly distributed throughout the resultant gelling food product constituent extrudate produced from or by extrusion of the admixture. As a result of the gelling food product constituent extrudate containing such freed and/or modified fiber from the as well as any ultrahigh extrusion pressure modified resistant starch or starches, which are uniformly distributed throughout the extrudate, any granules or pellets of the extrudate, as well as any grits, powder or flour comminuted therefrom, the resultant gel or food emulsion formed of the gel possesses greater stability and has a longer shelf life without other ingredients of a food product made therewith settling out or precipitating as a result of the fiber and/or resistant starch forming a gel matrix. This gel matrix formed by this fiber and/or resistant starch advantageously holds the other ingredients and helps retain the gel in place thereby enhancing the structural stability of the gel or food emulsion formed of the at least one and preferably the plurality of other ingredients and the gelling food product constituent extrudate or extruded gelling food product constituent composed of the gelling food product constituent extrudate. A gel or food emulsion formed of at least one other ingredient, preferably of at least a plurality of other ingredients, more preferably at least a plurality of pairs, i.e., at least three, of other ingredients, along with the gelling food product constituent extrudate or extruded gelling food product constituent composed of the gelling food product constituent extrudate as still another one of the food product ingredients advantageously produces a shelf-stable gel or shelf-stable food emulsion when mixed with water using a mixer that preferably is high shear mixer that has a shelf life of at least 6 months, preferably at least one year, and more preferably at least eighteen months without any of the ingredients settling or precipitating out.

The present invention also is directed to an extruded food product constituent that is an extruded gelling food product constituent composed of a gelling food product constituent extrudate having a gelling property that is configured by extrusion to gel and preferably form a gel that is a stable food emulsion when wetted with water and which is configured for use as an ingredient in one or more food products, such as soups, sauces, salad dressings, puddings, and non-dairy dairy substitute food products like non-dairy milk, non-dairy creamer, non-dairy whipped cream, non-dairy yogurt, non-dairy butter, non-dairy cream cheese, non-dairy cheese, and non-dairy ice cream, in which a gelling ingredient or an ingredient that is a conventional gelling gum is used to make the food product. In a preferred embodiment, the extruded gelling food product constituent is composed of at least some starch in a starch-containing admixture that is modified, preferably physically modified, during extrusion by an extruder at an extrusion pressure of at least 2000 PSI, preferably at least 3000 PSI, more preferably at least 4000 PSI, and even more preferably at least 5000 PSI, into a cold water-soluble modified starch gellant of a gelling food product constituent extrudate that gels when wetted with room temperature water and which is present at a great enough weight percent of at least five percent, preferably at least ten percent, more preferably at least fifteen percent, within the resultant gelling food product constituent extrudate that imparts a gelling property throughout the entire extrudate when wetted with water mixed uniformly throughout the extrudate. In at least one preferred method, any of starch-containing admixtures disclosed herein are extruded at an ultrahigh extrusion pressure of at least 7,500 PSI, can be and preferably is extruded in at least one method at an extrusion pressure of at least 10,000 PSI, and in at least one other method at an extrusion pressure of at least 15,000 PSI.

In a preferred method of making an extruded gelling food product constituent composed of a single gelling component or dual gelling component gelling food product constituent extrudate that is usable as a gelling food product ingredient in a food product that requires a gelling food product ingredient or a food product ingredient that gels when wetted, a starch-containing admixture having a moisture content of no more than twenty five percent by admixture weight and which is composed of at least fifteen percent starch by weight of the admixture, of which at least ten percent by weight of the admixture is amylopectin starch, is extruded in a single extruder at an extrusion pressure that is an ultrahigh extrusion pressure of at least 2000 PSI, preferably at least 3000 PSI, more preferably at least 4000 PSI, and even more preferably at least 5000 PSI, for a residency time of no longer than 20 seconds, preferably no longer than 15 seconds, more preferably no more than 10 seconds, and even more preferably no longer than about 7 seconds±2 seconds before being extruded through relatively small die holes of an extrusion die at a discharge end of the extruder as a gelling food product extrudate of the present invention.

In a preferred embodiment, the gelling food product extrudate produced from extruding one of chickpea, preferably whole grain or whole seed chickpea, yellow pea, preferably whole grain or whole seed yellow pea, under ultrahigh pressure extrusion using a single screw extruder contains extrusion-modified pregelatinized starch that gels and forms a gel component when the gelling extrudate is wetted with water mixed thoroughly therewith using a high shear mixer, and has a self-gelling gel component that forms a gel when the gelling extrudate is wetted with water mixed thoroughly therewith using a high shear mixer that preferably is a thermo-reversible gel. In such a preferred gelling food product extrudate, protein in the admixture is freed or modified during ultrahigh pressure extrusion crosslinks with starch modified during ultrahigh extrusion pressure extrusion into a plurality of different molecular weight starch polymers or starch-based polymers that polymerize when wetted with water to form a gel. The modified or freed proteins serve as a crosslinker or crosslinking agent that crosslinks the extrusion-modified starch polymers or starch-based polymers when wetted with water and mixed therewith using a high shear mixer. Such a gelling extrudate preferably is a self-gelling extrudate that absorbs at least four times water, preferably at least six times its weight in water, and more preferably absorbs at least eight times its weight in water and provides at least four times the thickening potency of cornstarch when wetted with water, preferably at least six times the thickening potency of cornstarch when wetted with water, and more preferably at least eight times the thickening potency of cornstarch when wetted with water. In a method of controlling viscosity, the ratio of water to gelling preferably self-gelling extrudate provides viscosity control of the resultant gel produced after wetting and high shear mixing with water with less water increasing viscosity up to a point beyond where the amount of water causes pasting and decreasing the viscosity as more water is used. In one preferred viscosity control method and embodiment, an equal ratio of water to gelling or self-gelling extrudate produces a gel, preferably a self-gelling gel, which has its highest or greatest viscosity with adding less water than what produces the highest or greatest viscosity increasing the amount of paste or paste present and adding more water than what produces the highest or greatest viscosity decreasing viscosity therefrom.

The present invention is therefore directed to an extruded food product constituent of the present invention that is configured for use as an ingredient of another food product and which is composed of a food product constituent extrudate configured to gel and preferably form a gel when wetted with water or an aqueous solution containing water. The present invention also is directed to a method of making such an extruded food product constituent composed of such a gelling food product constituent extrudate that is configured to gel when wetted with water and which preferably forms a gel when wetted with water, the gelling food product constituent extrudate produced by extruding a starch-containing admixture having a water content of no more than 25% by admixture weight using an extruder, preferably a single-screw extruder, adapted to subject the starch-containing admixture to an extrusion pressure of at least 2000 PSI, preferably at least 3000 PSI, and more preferably at least 5000 PSI, which is a sufficiently high extrusion pressure, an ultrahigh extrusion pressure, which modifies, preferably physically modifies, at least some of the starch or starches in the admixture into a cold water soluble extrusion-modified starch or a plurality of different cold water soluble extrusion-modified starches which impart or imparts a gelling characteristic to the extrudate by gelling and preferably forming a gel when the extrudate is wetted with water at a room temperature of about 20° Celsius or 68° Fahrenheit, i.e., 20° Celsius±1° Celsius or 68° Fahrenheit±2° Fahrenheit. In a preferred method and embodiment, subjecting such a preferred gelling extrudate configured starch-containing admixture to such a high extrusion pressure that is an ultrahigh extrusion pressure of at least 2500 PSI, preferably at least 4000 PSI, more preferably at least 5000 PSI, also frees and/or modifies protein or proteins in the admixture that help facilitate gelling of the extrudate when wetted with water or an aqueous solution composed of water at a temperature that is at room temperature or about room temperature.

The gelling food product constituent extrudate exiting a perforate extrusion die of the extruder is subjected to at least one of cooling and drying without the application of heat and preferably is subjected to both cooling and drying upon the extrudate exiting the extruder die to freeze the water-soluble gelling property of the extrusion modified starch or extrusion modified starches. The gelling food product constituent extrudate is formed into a granular gelling extrudate by being comminuted into pellets or granules of gelling extrudate after extrusion, preferably by being comminuted into pellets or granules, such as preferably by a high-speed rotary knife, upon the gelling extrudate being extruded from at least a plurality of pairs of die holes formed in the perforate extrusion die of the single screw extruder during ultrahigh pressure extrusion of the extrudate. If desired, the extrudate can be comminuted into grits, meal, powder, or flour, such as by milling, grinding or pulverizing the extrudate, including after the extrudate has been cut into pellets or granules, such as by a high-speed rotary knife upon or after extrusion, preferably upon or after exiting the perforate die of the extruder. In a preferred method and embodiment, the gelling extrudate is comminuted into one of a gelling admixture powder or gelling admixture flour that gels when mixed thoroughly with water, preferably using a high shear mixer, preferably forming a gel that more preferably is a self-gelling gel or which at least has a self-gelling component.

A preferred extruded food product constituent of the present invention is a gelling extruded food product constituent composed a granular gelling food product constituent extrudate that gels when wetted with water and which contains enough of the extrusion-modified starch or starches formed of starch or starches in the starch-containing admixture modified, preferably by being physically modified, during ultrahigh pressure extrusion to impart a gelling characteristic to substantially the entirety of the extrudate when wetted with water or an aqueous solution. In a preferred embodiment and method, at least one of the amylose starch and amylopectin starch in the starch-containing mixture is modified, preferably physically modified, during ultrahigh pressure extrusion by reducing at least one of the molecular weights, and/or number of branches of at least a plurality of pairs, i.e., at least three, molecules of the one of amylose starch and amylopectin starch.

When enough water is added to wet substantially the entirety of the granules, pellets or particles of the granular gelling food product constituent extrudate when mixed therewith, preferably using a high shear mixer, the gelling of the extrusion-modified starch or extrusion-modified starches wetted by the water imparts a gelling property to the granular gelling food product constituent extrudate. In a preferred embodiment, the extrusion-modified starch or extrusion-modified starches are substantially uniformly distributed throughout the granular gelling food product constituent extrudate such that substantially the entirety of the granular gelling food product constituent extrudate gels when enough water is added and thoroughly mixed with the granular gelling food product constituent extrudate, preferably using a high shear mixer, to substantially uniformly wet the granules, pellets, or particles of the granular gelling food product constituent extrudate such that substantially uniform gelling of the wetted extrudate occurs.

In one preferred method of making an extruded granular food product constituent composed of a single gelling component or dual gelling component gelling food product constituent extrudate in accordance with the present invention, the gelling granular food product constituent extrudate is extruded from starch-containing admixture configured to produce a gelling granular food product constituent extrudate of the present invention that is composed of at least 10% starch by admixture weight, preferably at least 20% starch by admixture weight, and more preferably at least 30% starch by admixture weight when extruded by an extruder that preferably is a single screw extruder while the starch-containing admixture is subjected to an extrusion pressure of at least 2000 PSI, preferably at least 3000 PSI, more preferably at least 5000 PSI, for a residency time within the extruder before exiting out the perforate die of the extruder that is no more than 20 seconds, preferably no more than 15 seconds, more preferably no more than 10 seconds, and even more preferably no more than about 7 seconds±2 seconds. One such preferred gelling extruded food product constituent of the present invention is composed a gelling food product constituent extrudate that forms a gel when wetted water and which is extruded from a starch-containing admixture formulated for producing gelling food product constituent extrudate, the starch-containing admixture composed of at least 10% starch by admixture weight, preferably at least 20% starch by admixture weight, and more preferably at least 30% starch by admixture weight that is extruded using an extruder that preferably is a single screw extruder while the starch-containing admixture is subjected to an ultrahigh extrusion pressure within the extruder of at least 2000 PSI, preferably at least 3000 PSI, more preferably at least 5000 PSI, and for a residency time within the extruder that is no more than 20 seconds, preferably no more than 15 seconds, more preferably no more than 10 seconds, and even more preferably no more than about 7 seconds±2 seconds before exiting out the perforate extrusion die of the extruder.

Preferred embodiments of starch-containing admixtures configured for producing gelling extrudates of the present invention when subjected to ultrahigh pressure extrusion are composed of one or more cereal grains, such as preferably sorghum, one or more legumes, such as preferably one or more of lentils, chickpeas, green peas, beans and soybeans, one or more pulses, such one or more of lentils, chickpeas, green peas, beans and soybeans, and/or one or more starchy fruits, such as plantain, green banana, peanuts, pumpkin, figs, raisins, plums, and certain types of squash, which contain at least 5% unmodified starch by weight, preferably contain at least 25% unmodified starch by weight, and more preferably contain 40% unmodified starch by weight. Preferred gelling extrudates producing starch-containing admixtures configured for being extruded under an ultrahigh extrusion pressure of at least 2000 PSI, preferably at least 3000 PSI, more preferably at least 4000 PSI, even more preferably at least 5000 PSI, contains at least 15% starch by dry admixture weight before any moisture, such as in the form of water, is added thereto, preferably contains at least 25% starch by dry admixture weight before any water is added thereto, and more preferably contains at least 40% starch by dry admixture weight before any water is added thereto, and has a moisture content of no greater than 25%, preferably no more than 22.5%, and more preferably no more than about 18%±2% moisture content when entering the single-screw extruder.

In such a preferred method and embodiment, the starch-containing admixture is extruded from the single screw extruder at an ultrahigh extrusion pressure of at least 2000 PSI, preferably of at least 3000 PSI, and more preferably of at least 4000 PSI, and even more preferably at least 5000 PSI, which is a high enough extrusion pressure to modify starches in the starch-containing admixture that have a first molecular weight or a first plurality of molecular weights into starch-based polymers in the extrudate that gel and preferably form a gel when wetted with water which a second molecular weight or second plurality of molecular weights smaller than the first molecular weight or first plurality of molecular weights of the starches in the admixture which were modified during extrusion. In one such preferred method and embodiment, the starch-containing admixture is extruded from the single screw extruder at an ultrahigh extrusion pressure of at least 2500 PSI, preferably of at least 3000 PSI, and more preferably of at least 4000 PSI, which is a high enough extrusion pressure to physically modify enough of the starches in the starch-containing admixture having a first molecular weight or a first plurality of molecular weights into enough water-soluble starch-based polymers in the extrudate that gel and preferably form a gel when wetted with water which have a second molecular weight or second plurality of molecular weights smaller than the first molecular weight or first plurality of molecular weights of the starches in the admixture which were modified during extrusion. This produces an extrudate composed of enough of these water-soluble starch-based polymers formed of the starches in the admixture that were physically modified during ultrahigh pressure extrusion into lower molecular weight water-soluble starch-based polymers thereby forming a gelling water-absorbing extrudate that swells at least four times in size from absorbing at least four times its weight in water in forming a gel that has a viscosity of at least 10,000 centipoise, preferably at least 50,000 centipoise, and more preferably at least 100,000 centipoise.

In a preferred embodiment, an ultrahigh extrusion pressure modified starch polymer gelling extrudate of the present invention formed of a starch-containing admixture that is extruded using a single-screw extruder that subjects the admixture to an ultrahigh extrusion pressure of at at least 2500 PSI, preferably of at least 3000 PSI, and more preferably of at least 4000 PSI, which modifies starches in the admixture into water-soluble starch-based gelling polymers having lower molecular weights than the starches from which the gelling polymers were modified that gel when wetted with water. The resultant ultrahigh extrusion pressure modified starch polymer gelling extrudate that is formed from the aforementioned extrudate during ultrahigh pressure extrusion contains enough of the ultrahigh extrusion pressure modified starch gelling polymer as a fraction or percentage of the total ultrahigh extrusion pressure modified starch polymer gelling extrudate such that wetting of the extrudate causes the ultrahigh extrusion pressure modified starch gelling polymer in the extrudate to gel thereby producing a wetted ultrahigh extrusion pressure modified starch polymer gelling extrudate where the gel is relatively uniformly and preferably substantially homogenously distributed throughout the wetted extrudate. In at least one embodiment, the resultant extrudate contains enough water-soluble starch-based gelling polymer(s) disposed substantially uniformly or generally homogenously throughout the entire extrudate such that wetting the extrudate with water causes gelling of substantially the entire extrudate such that wetting the extrudate with water turns substantially all of the extrudate substantially completely into an emulsion or gel.

One such preferred ultrahigh extrusion pressure modified starch polymer gelling extrudate formed from the aforementioned extrudate during a method of making the same by ultrahigh pressure extrusion contains at least 5% by weight of the extrudate, preferably at least 10% by extrudate weight, and more preferably at least 15% by extrudate weight of the ultrahigh extrusion pressure modified starch gelling polymer such that wetting of the extrudate causes the ultrahigh extrusion pressure modified starch gelling polymer in the extrudate to gel producing a wetted ultrahigh extrusion pressure modified starch polymer gelling extrudate where the gel is relatively uniformly and preferably substantially homogenously distributed throughout the wetted extrudate.

In another preferred embodiment, an ultrahigh extrusion pressure modified starch polymer gelling extrudate of the present invention formed of a starch-containing admixture that is extruded using a single-screw extruder that subjects the admixture to an ultrahigh extrusion pressure of at at least 2500 PSI, preferably of at least 3000 PSI, and more preferably of at least 4000 PSI, which modifies starches in the admixture into one or more and preferably at least a plurality of water-soluble starch-based self-gelling polymers having lower molecular weights than the starches from which the gelling polymers were modified. The resultant ultrahigh extrusion pressure modified starch polymer gelling extrudate that is formed from the aforementioned extrudate during ultrahigh pressure extrusion contains enough of the ultrahigh extrusion pressure modified starch gelling polymer as a fraction or percentage of the total ultrahigh extrusion pressure modified starch polymer gelling extrudate such that wetting of the extrudate causes the ultrahigh extrusion pressure modified starch gelling polymer in the extrudate to gel producing a wetted ultrahigh extrusion pressure modified starch polymer gelling extrudate where the gel is relatively uniformly and preferably substantially homogenously distributed throughout the wetted extrudate. One such preferred ultrahigh extrusion pressure modified starch polymer gelling extrudate formed from the aforementioned extrudate during a method of making the same by ultrahigh pressure extrusion contains at least 5% by weight of the extrudate, preferably at least 10% by extrudate weight, and more preferably at least 15% by extrudate weight of the ultrahigh extrusion pressure modified starch gelling polymer such that wetting of the extrudate causes the ultrahigh extrusion pressure modified starch gelling polymer in the extrudate to gel producing a wetted ultrahigh extrusion pressure modified starch polymer gelling extrudate where the gel is relatively uniformly and preferably substantially homogenously distributed throughout the wetted extrudate.

Gelling extrudate produced using a method of making the same described hereinabove also is or can be used in an instantized food product that can be and which preferably is a pregelatinized food product, and which can be configured as an extruded gelling food product that gels or possesses a gelling characteristic when water is added thereto wetting the extruded gelling food product, an extruded food product constituent configured for use as a constituent or ingredient of a food product containing at least one other constituent or ingredient, a gelling extruded food product constituent that gels, preferably self-gels, when wetted with water and which is configured for use as a gelling constituent or gelling ingredient of a food product containing at least one other constituent or ingredient that imparts a gelling characteristic to the food product, and methods of making these extruded food products and extruded food product constituents or ingredients by extrusion at sufficiently high extrusion pressures that modify at least some of the starch during extrusion in a manner that imparts the desired instantized, pregelatinized and/or gelling characteristics or properties thereto. The present invention also is directed to a method of respectively making these extruded food products and extruded food product constituents or ingredients using an extruder, preferably a single screw extruder, to extrude a starch-containing admixture under such sufficiently high extrusion pressures that modifies at least some of the starch in the admixture into a modified starch that imparts the desired instantized, pregelatinized, and/or gelling properties or characteristics to the extruded food product, extruded food product constituent, and/or food product made with the extruded food product constituent.

Another aspect of the present invention is directed to an instantized gelling extruded food product that is an instantized gelling food product extrudate that is a ready-to-eat meal in its as-extruded form that only requires the addition of water, which can be water at room temperature, to make the instantized food product extrudate into one of a congee porridge, a harissa porridge, an oatmeal porridge, a genfo porridge, a polenta porridge, a gruel porridge, a grits porridge, and a pudding porridge, e.g., a pudding such as a hasty pudding or the like, which is then ready to eat. In a preferred embodiment, the instantized gelling food product extrudate in accordance with that disclosed above is used in its as-extruded form with only water added to the instantized food product extrudate transforming the wetted-instantized food product extrudate into a human edible food product that can be eaten using a spoon or fork. The instantized food product extrudate preferably is in a dry granular form or dry particulate form and can be provided in a dry powder form if desired. In use, water, which can be room temperature water, is added and mixed with the granules, pellets, or particles of instantized food product extrudate, such as by using a stirrer, which can be a spoon or fork, until nearly all, preferably substantially all, of the granules, pellets, or particles of the instantized food product extrudate are wetted with the water.

In a preferred embodiment, the instantized gelling extruded food product is a room-temperature water instantized extruded food product made of granular instantized food product extrudate that is at least partially composed of a cold water-soluble component that goes into solution when room temperature water having a temperature of about 20° Celsius or about 68° Fahrenheit is added to the granular instantized food product extrudate and mixed therewith. In one preferred embodiment, the instantized extruded food product is a room-temperature water instantized extruded food product made of granular instantized food product extrudate that is at least partially composed of (a) a cold water-soluble component, preferably a granular cold-water soluble component, which goes into solution when room temperature water is added to the granular instantized food product extrudate and mixed therewith, and (b) a water dispersible component, which preferably is a cold-water dispersible component, which goes into solution in the room temperature water that is added to the granular instantized food product extrudate and mixed therewith. In another preferred embodiment, the instantized extruded food product is a room-temperature water instantized extruded food product made of granular instantized food product extrudate that is at least partially composed of (a) a cold water-soluble component, preferably a granular cold-water soluble component, which goes into solution in the room temperature water when room temperature water is added to the granular instantized food product extrudate and mixed therewith, and (b) a water dispersible component, which preferably is a cold-water dispersible component, which goes into solution in the room temperature water that is added to the granular instantized food product extrudate and mixed therewith forming an emulsion. In a further preferred embodiment, the instantized extruded food product is a room-temperature water instantized extruded food product made of granular instantized food product extrudate that is at least partially composed of (a) a cold water-soluble component, preferably a granular cold-water soluble component, which goes into solution in the room temperature water when room temperature water is added to the granular instantized food product extrudate and mixed therewith, (b) a water dispersible component, which preferably is a cold-water dispersible component, which goes into solution in the room temperature water when the room temperature water is added to the granular instantized food product extrudate and mixed therewith which can and preferably does form an emulsion, and (c) a self-gelling component, which forms a gel when the room temperature water is added to the granular instantized food product extrudate and mixed therewith.

Depending on the size(s) or range(s) of size(s) of the instantized gellikng food product extrudate granules, pellets or particles, as well as the amount or volume of water mixed therewith, the resultant wetted instantized extruded food product formed upon mixing with water can be configured to have at least a plurality, preferably at least a plurality of pairs, i.e., at least three, of taste, flavor, flavor intensity, appearance, texture and/or mouthfeel of a porridge, gruel, or pudding. In one preferred instantized extruded food product and instantized food product extrudate of the present invention, depending on the sizes or size ranges of the instantized food product extrudate granules, pellets or particles, as well as the amount or volume of water mixed therewith, the resultant wetted instantized extruded food product formed upon mixing with water can be configured to have at least a plurality, preferably at least a plurality of pairs, i.e., at least three, of the following food characteristics of taste, flavor, flavor intensity, appearance, texture and/or mouthfeel of a congee porridge or congee-type porridge, a harissa porridge or harissa-type porridge, an oatmeal porridge or oatmeal-type porridge, a genfo porridge or genfo-type porridge, a polenta porridge or a polenta-type porridge, a gruel porridge or a gruel-type porridge, a grits porridge or a grits-type porridge, and a pudding porridge, e.g., a pudding such as a hasty pudding.

The resultant granular extruded instantized food product is packaged, such as by being placed in an airtightly sealed single serving pouch configured with a tear-off sealed end or edge or tear-open arrangement that enables the pouch to be opened and its contents, namely a single serving of the granular extruded instantized food product, poured, emptied or otherwise transferred to a container, preferably a bowl, to which water is added to transform the extruded instantized food product into a ready-to-eat extruded instantized food product meal composed of water-wetted instantized food product extrudate that can be scooped up from the container, preferably the bowl, with a spoon or fork and eaten. Where a single-serving pouch is used, the pouch can be configured to provide an additional volume for water, including warm or hot, e.g., boiling, water, to be added to the extruded instantized food product while in the pouch and shaken or stirred to mix the water therewith. If desired, the resultant extruded instantized food product can be packaged into a multiple serving package that preferably also is airtight and which is resealable to enable one or more servings to be controllably dispensed into one or more containers, preferably bowls, to which water is added to produce a ready-to-eat extruded instantized food product meal of the present invention that can be scooped up or otherwise picked up using a fork or spoon and eaten.

Another aspect of this invention is a method of making an instantized extruded food product from an admixture composed of starch-containing material along with at least one additional food constituent that provides one of nutrition, flavor, smell, aroma, texture, or mouthfeel, which is extruded by an extruder that preferably is a single-screw extruder under a controllably high enough extrusion pressure of at least 2500 PSI, preferably at least 4000 PSI, more preferably at least 5000 PSI, which is a suitably high ultrahigh extrusion pressure that produces an instantized food product extrudate of the present invention composed of an instantizable constituent, preferably an instantized food product constituent, substantially uniformly mixed with the at least one additional food constituent. A preferred implementation of the method further includes cooling and drying the instantized food product extrudate that preferably is a single gelling component or dual gelling component gelling food product constituent extrudate upon exiting the extruder and doing so without the application of heat. The resultant instantized food product extrudate preferably has a moisture content of no greater than about 8%, and preferably a moisture content of no greater than 6%, producing instantized food product extrudate having a low water activity of no greater than 0.5 and which remains shelf stable at room temperature of between about 20° Celsius or about 68° Fahrenheit for at least six months, preferably for at least one year, and more preferably for at least two years.

In a preferred implementation of a method of making an instantized extruded food product in accordance with the present invention, the at least one additional food product constituent not only becomes homogeneously mixed together with the starch-containing material in the instantized food product extrudate that exits the extruder, but subjecting the at least one additional food product constituent to such an ultrahigh extrusion pressure of at least of at least 2500 PSI, preferably at least 4000 PSI, more preferably at least 5000 PSI for a residency time of no longer than 20 seconds, preferably no longer than 15 seconds, more preferably no longer than 10 seconds, and even more preferably no longer than 7 seconds±2 seconds thereby modifies one or more starches and/or proteins present in the admixture in a manner that helps facilitate digestibility thereof in the ready-to-eat instantized food product extrudate when consumed after water is added. In one such preferred method implementation, starches and proteins are modified, preferably primarily by being physically modified, into modified starches preferably having increased digestibility and cold water-soluble modified starches, at least some of which can be and preferably are or become polymerized by the water, preferably room-temperature water, added to produce the instantized extruded food product, and which can become cross-linked by protein in the admixture, preferably by extrusion-modified protein. This can facilitate and preferably even cause formation of an emulsion and/or gel as separate components of the instantized extruded food product produced when water, preferably room-temperature water, is added to and mixed with the instantized food product extrudate.

In one preferred method implementation, the at least one additional food constituent is one of corn, preferably dehydrated corn, green beans, preferably dehydrated green beans, carrots, preferably dehydrated carrots, tomatoes, preferably dehydrated tomatoes, and meat, preferably dehydrated meat, such as beef, preferably dehydrated beef, chicken, preferably dehydrated chicken, pork, preferably dehydrated pork, ham, preferably dehydrated ham, and/or turkey, preferably dehydrated turkey. Therefore, in a preferred implementation of a method of making an instantized food product extrudate in accordance with the present invention, the admixture is composed of a starch-containing material and at least one additional food constituent that can be at least one of corn, preferably dehydrated corn, green beans, preferably dehydrated green beans, carrots, preferably dehydrated carrots, tomatoes, preferably dehydrated tomatoes, and meat, preferably dehydrated meat, such as beef, preferably dehydrated beef, chicken, preferably dehydrated chicken, pork, preferably dehydrated pork, ham, preferably dehydrated ham, and/or turkey, preferably dehydrated turkey that preferably is in comminuted form and which has a moisture content of no more than 20%, preferably no more than 18%, and more preferably no more than about 17%±2% before being introduced into the extruder.

In one such preferred method implementation where the extruder is a single screw extruder, no additional water or moisture is added to the admixture while inside the extruder such that no additional moisture or water is added to the admixture while undergoing extrusion in the extruder. Where it is necessary to add moisture to the admixture, an amount of moisture is added such that the total moisture content of the admixture is no more than 20%, preferably no more than 18%, and more preferably no more than about 17%±2%. Where the extruder is a single screw extruder, no additional moisture or water is added to the admixture inside the extruder while undergoing extrusion.

In one preferred implementation, the starch-containing material of the admixture is provided by at least one of a cereal grain, preferably at least one of sorghum, corn, rice, oats, wheat or barley, more preferably at least one of whole grain sorghum, whole-grain corn, whole-grain oats, whole-grain wheat, or whole-grain barley, the at least one additional food constituent of the admixture is provided by one of corn, preferably dehydrated corn, green beans, preferably dehydrated green beans, carrots, preferably dehydrated carrots, tomatoes, preferably dehydrated tomatoes, and meat, preferably dehydrated meat, such as beef, preferably dehydrated beef, chicken, preferably dehydrated chicken, pork, preferably dehydrated pork, ham, preferably dehydrated ham, and/or turkey, preferably dehydrated turkey, and has a moisture content of no greater than 20%, preferably no greater than 18% and more preferably no greater than about 15%±1%. In another preferred implementation, the starch-containing material of the admixture is provided by at least one of a cereal grain, preferably at least one of sorghum, corn, rice, oats, wheat or barley, more preferably at least one of whole grain sorghum, whole-grain corn, whole-grain oats, whole-grain wheat, or whole-grain barley, the at least one additional food constituent of the admixture is provided by a plurality of corn, preferably dehydrated corn, green beans, preferably dehydrated green beans, carrots, preferably dehydrated carrots, tomatoes, preferably dehydrated tomatoes, and meat, preferably dehydrated meat, such as beef, preferably dehydrated beef, chicken, preferably dehydrated chicken, pork, preferably dehydrated pork, ham, preferably dehydrated ham, and/or turkey, preferably dehydrated turkey, and has a moisture content of no greater than 20%, preferably no greater than 18% and more preferably no greater than about 15%±1%. If desired, the admixture can also contain one or more (a) seasonings, such as one or more of an adobo seasoning, a berbere seasoning, a Cajun seasoning, a chimichurri blend seasoning, a chipotle seasoning, a masala or garam masala seasoning, a five spice powder seasoning, a gumbo seasoning, a fajita seasoning, a jerk seasoning, a garlic pepper seasoning, a kabsa spice mix seasoning, a paella seasoning, a lemon pepper seasoning, a Mediterranean blend seasoning, an Italian seasoning, a pizza seasoning, and/or one or more other types of seasoning, (b) spices, such as one or more of allspice, anise, annatto, arrowroot, black garlic, black pepper, caraway, cardamom, cayenne pepper, celery seed, cinnamon, cloves, cocoa, coconut powder, coriander, cumin, cream of tartar, dill, fennel, fenugreek, galangal, garam masala, garlic, ginger, grains of paradise, mango, horseradish, chili powder, vanilla, curry, juniper berries, lavender, lemon peel, lime peel, long pepper, mace, mustard, nigella seed, nutmeg, onion powder, paprika, peppercorns, poppy seeds, red pepper, saffron, sesame seeds, vanilla, vanilla powder, curry powder, wasabi, white pepper and/or another type of spice, (c) herbs, such as one or more of basil, bay leaves, chervil, chive flakes, cilantro, dill pollen, dill weed, fennel pollen, herbes de provence, lime leaves, lavender, lemongrass, marjoram, oregano, parsley, peppermint, rosemary, sage, sassafras, savory, shallots, and one or more other types of herbs, or (d) a salt, e.g., table salt, all of which is substantially homogeneously mixed together with the rest of the aforementioned constituents of the admixture before being extruded using the extruder configured to subject the admixture while inside the extruder to a pressure of at least at least 2500 PSI, preferably at least 4000 PSI, more preferably at least 5000 PSI. Where a single extruder is used to extrude the admixture and produce instantized food product extrudate, the admixture is subjected to pressure within the extruder for a residency time of no more than 15 seconds, preferably no more than 10 seconds, and more preferably no more than about 7 seconds±2 seconds at an ultra-high internal extrusion pressure at a perforate extrudate exit die of the extruder of at least 2500 psi, preferably at least 4000 psi, and more preferably at least 5000 psi, In still another preferred implementation, the starch-containing material of the admixture is provided by at least one of a cereal grain, preferably at least one of sorghum, corn, rice, oats, wheat or barley, more preferably at least one of whole grain sorghum, whole-grain corn, whole-grain oats, whole-grain wheat, or whole-grain barley, the at least one additional food constituent of the admixture is provided by at least two different of the following: corn, preferably dehydrated corn, green beans, preferably dehydrated green beans, carrots, preferably dehydrated carrots, tomatoes, preferably dehydrated tomatoes, and meat, preferably dehydrated meat, such as beef, preferably dehydrated beef, chicken, preferably dehydrated chicken, pork, preferably dehydrated pork, ham, preferably dehydrated ham, and/or turkey, preferably dehydrated turkey, and has a moisture content of no greater than 20%, preferably no greater than 18% and more preferably no greater than about 15%±1%. In carrying out this method implementation, the admixture is extruded using an extruder that preferably is a single screw extruder that subjects the admixture to an extrusion pressure while the admixture is within the extruder of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds.

In a first preferred implementation of a method of making an instantized extruded food product and instantized food product extrudate and an instantized extruded food product and instantized food product extrudate embodiment, the admixture is composed of a rice, such as white rice, jasmine rice or basmati rice, preferably whole grain rice, such as whole grain white rice, whole grain jasmine rice or whole grain basmati rice, as the starch-containing material, to which is added a plurality of spices, herbs and/or seasonings and which can and preferably does contain some salt. The admixture is extruded preferably using a single screw extruder at an ultrahigh extrusion pressure of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds thereby extruding a congee instantized food product extrudate preferably in granular form that preferably is a ready-to-eat congee instantized extruded food product which only requires water to be added thereto and mixed therewith in order to be consumed by a person. The congee instantized food product extrudate is comminuted into a granular or pelletized form during or upon extrusion that can be further comminuted, such as by grinding or milling the granular or pelletized extrudate into smaller more finely ground particles producing a congee instantized food product extrudate powder or flour to which water, which can be room temperature water, is added and mixed to produce a congee instantized extruded food product in accordance with the present invention.

In a first such preferred implementation of a method of making an instantized extruded congee food product and instantized congee food product extrudate and at least one embodiment thereof, the admixture from which the congee instantized food product extrudate is extruded also contains at least one and preferably a plurality of additional food product constituents, including at least one or more food product constituents disclosed hereinabove, and which each provides or imparts a corresponding different one of nutrition, flavor, smell, aroma, texture, or mouthfeel to the resultant ready-to-eat congee instantized extruded food product that is produced when water is added to the congee instantized food product extrudate and mixed therewith. In one such method implementation and embodiment, the admixture configured for making a congee instantized food product extrudate also contains at least one and preferably a plurality of additional food product constituents, including one or more of which are disclosed elsewhere herein, including at least one food product constituent containing less than 5% starch by weight, and which each provides or imparts a corresponding different one of nutrition, flavor, smell, aroma, texture, or mouthfeel to the resultant ready-to-eat congee instantized extruded food product that is produced when water is added to the congee instantized food product extrudate and mixed therewith. As previously indicated, such an admixture can also contain one or more and even a plurality of pairs, at least three, of seasonings, spices and herbs, including one or more and even a plurality of pairs, at least three, of the seasonings, spices and herbs disclosed hereinabove.

In such a first preferred method and implementation, the granular, pelletized, powdered or flour congee instantized food product extrudate provides a dry granular, pelletized, powdered or flour extruded instantized food product base to which is blended at least one, and preferably a plurality of pairs, i.e., at least three, of dry or dried additional food product constituents, such as at least one or more of the food product constituents disclosed hereinabove, producing a ready-to-eat partially instantized food product of the present invention when water, preferably hot water, more preferably boiling water, is added that is a congee porridge that contains at least a plurality of pairs, i.e., of edible pieces or edible chunks of each one of the dry or dried additional food product constituents which were blended to the congee instantized food product extrudate after extrusion. Each one of the dry or dried food product constituents blended with the dry granular, pelletized, powdered or flour extruded instantized food product base preferably is in the form of a dehydrated or freeze-dried food product constituent. When water, preferably warm or hot water, more preferably boiling water, is added to such a ready-to-eat partially instantized food product of the present invention, the water instantizes the instantized food product extrudate and rehydrates each piece or chunk of each one of the food product constituents blended with the instantized food product extrudate to produce the ready-to-eat partially instantized food product. The result is a wet mushy food product of the present invention in the form of a congee porridge that can be scooped out of a bowl in which it is contained using a spoon or even a fork and eaten.

In another such preferred method implementation and embodiment of a congee-type instantized food product extrudate and congee-type extruded instantized food product of the present invention, at least one and preferably at least a plurality of pairs, i.e., at least three, of seasonings, spices, and/or herbs are also blended with the granular, pelletized, powdered or flour congee instantized food product extrudate. Where the congee instantized food product extrudate provides a dry or dried granular extruded instantized food product base like that disclosed in the preceding paragraph to which preferably is blended a plurality of pairs, i.e., at least three, of dry or dried additional food product constituents, such as at least one or more of the food product constituents disclosed hereinabove, at least one and preferably a plurality of pairs, i.e., at least three, of seasonings, spices and/or herb are also blended with the instantized food product extrudate either prior to, during or after blending of the at least one and preferably at least a plurality of pairs, i.e., at least three, of seasonings, spices and/or herbs. The dry or dried granular ready-to-eat partially instantized food product resulting from carrying out one or more of the blending steps disclosed herein can be packaged, such as in a single serving tear-open gas-tight and water-tight pouch, such as discussed above, and/or in a multiple-serving container, in the form of a box, e.g., cardboard or paperboard box, a plastic container, a pressed-fiber container, or another type of container that can be of gas-tight and water-tight construction and which can be and preferably also is resealable.

In a second preferred implementation of a method of making an instantized extruded food product and instantized food product extrudate and an instantized extruded food product and instantized food product extrudate embodiment that is a corn grits instantized food product extrudate and corn grits extruded instantized food product, the admixture is composed of a corn, such as a hominy corn, such as preferably a whole grain hominy corn, a white corn, such as preferably a whole grain white corn, or a combination thereof, as the starch-containing material, to which is added at least one and preferably at least a plurality of spices, herbs and/or seasonings and which can and preferably also does contain some salt. This admixture is extruded preferably using a single screw extruder at an ultrahigh extrusion pressure of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds thereby extruding a corn grits instantized food product extrudate preferably in granular form that preferably is a ready-to-eat corn grits instantized extruded food product which only requires water to be added thereto and mixed therewith in order to be consumed by a person. The corn grits instantized food product extrudate is comminuted into a granular or pelletized form during or upon extrusion and can also be further comminuted, such as by grinding or milling the granular or pelletized instantized food product extrudate into smaller more finely ground particles producing a corn grits instantized food product extrudate powder or flour to which water, which can be room temperature water, is added and mixed to produce a corn grits instantized extruded food product in accordance with the present invention.

In a second such preferred implementation of a method of making a corn grits instantized extruded food product and corn grits instantized food product extrudate and at least one embodiment thereof, the admixture from which the corn grits instantized food product extrudate is extruded also contains at least one and preferably a plurality of additional food product constituents, including at least one or more of the food product constituents disclosed hereinabove, which each provides or imparts a corresponding different one of nutrition, flavor, smell, aroma, texture, or mouthfeel to the resultant ready-to-eat corn grits instantized extruded food product that is produced when water is added to the corn grits instantized food product extrudate and mixed therewith. In one such method implementation and embodiment, the admixture also contains at least one and preferably a plurality of additional food product constituents, including one or more of which are disclosed elsewhere herein, including at least one food product constituent containing less than 5% starch by weight, which also each respective provides or imparts a different one of nutrition, flavor, smell, aroma, texture, or mouthfeel to the resultant ready-to-eat corn grits instantized extruded food product produced when water is added to the corn grits instantized food product extrudate and mixed therewith. As previously indicated, such an admixture can also contain one or more and even a plurality of pairs, at least three, of seasonings, spices and herbs, including one or more and even a plurality of pairs, at least three, of the seasonings, spices and herbs disclosed hereinabove.

In such a second preferred method and implementation, the granular, pelletized, powdered or flour corn grits instantized food product extrudate provides a dry granular, pelletized, powdered or flour extruded instantized corn grits food product base to which is blended at least one, and preferably a plurality of pairs, i.e., at least three, of dry or dried additional food product constituents, such as at least one or more of the food product constituents disclosed hereinabove, producing a ready-to-eat partially instantized corn grits food product of the present invention when water, preferably hot water, more preferably boiling water, is added that is a corn grits porridge or corn grits-type porridge that contains at least a plurality of pairs, i.e., of edible pieces or edible chunks of each one of the dry or dried additional food product constituents blended to the corn grits instantized food product extrudate after extrusion. Each one of the dry or dried food product constituents blended with the dry granular, pelletized, powdered or flour extruded instantized food product base preferably is in the form of a dehydrated or freeze-dried food product constituent. When water, preferably warm or hot water, more preferably boiling water, is added to such a ready-to-eat partially instantized food product of the present invention, the water instantizes the instantized food product extrudate and rehydrates each piece or chunk of each one of the food product constituents blended with the instantized food product extrudate to produce another preferred ready-to-eat partially instantized food product. In a preferred method implementation and embodiment, at least a plurality of pairs of dehydrated or freeze-dried kernels of hominy corn, kernels of white corn, or combination of dehydrated or freeze-dried kernels or hominy corn and white corn are blended with the corn grits instantized food product extrudate to produce a further preferred ready-to-eat partially instantized corn grits food product of the present invention. The result when mixed with water is a wet mushy and lumpy porridge-like food product of the present invention in the form of a corn grits porridge that can be scooped out of a bowl in which it is contained using a spoon, or even a fork, and eaten.

In another such preferred method implementation and embodiment of a corn-grits type instantized food product extrudate and corn-grits type extruded instantized food product of the present invention, at least one and preferably at least a plurality of pairs, i.e., at least three, of seasonings, spices, and/or herbs are also blended with the granular, pelletized, powdered or flour corn grits instantized food product extrudate. Where the corn grits instantized food product extrudate provides a dry or dried granular extruded instantized food product base like that disclosed in the preceding paragraph to which preferably is blended a plurality of pairs, i.e., at least three, of dry or dried additional food product constituents, such as at least one or more of the food product constituents disclosed hereinabove, at least one and preferably a plurality of pairs, i.e., at least three, of seasonings, spices and/or herb are also blended with the instantized food product extrudate either prior to, during or after blending of the at least one and preferably at least a plurality of pairs, i.e., at least three, of seasonings spices and/or herbs. The dry or dried granular ready-to-eat partially instantized corn grits food product resulting from carrying out one or more of the blending steps disclosed herein can be packaged, such as in a single serving tear-open gas-tight and water-tight pouch, such as discussed above, and/or in a multiple-serving container, in the form of a box, e.g., cardboard or paperboard box, a plastic container, a pressed-fiber container, or another type of container that can be of gas-tight and water-tight construction and which can be and preferably also is resealable.

In a third preferred implementation of a method of making an instantized extruded food product and instantized food product extrudate and an instantized extruded food product and instantized food product extrudate embodiment in the form of a harissa instantized food product extrudate and harissa extruded instantized food product, the admixture is composed of a wheat, such as a cracked wheat, or preferably a whole wheat, as the starch-containing material, to which is added at least one and preferably at least a plurality of spices, herbs and/or seasonings and which can and preferably also does contain some salt. This admixture is extruded preferably using a single screw extruder at an ultrahigh extrusion pressure of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds thereby extruding a harissa instantized food product extrudate preferably in granular form that preferably is a ready-to-eat harissa instantized extruded food product which only requires water to be added thereto and mixed therewith in order to be consumed by a person. The harissa instantized food product extrudate is comminuted into a granular or pelletized form during or upon extrusion and can also be further comminuted, such as by grinding or milling the granular or pelletized instantized food product extrudate into smaller more finely ground particles producing a harissa instantized food product extrudate powder or flour to which water, which can be room temperature water, is added and mixed to produce a harissa instantized extruded food product in accordance with the present invention.

In a third such preferred implementation of a method of making a harissa instantized extruded food product and harissa instantized food product extrudate and at least one embodiment thereof, the admixture from which the harissa instantized food product extrudate is extruded also contains at least one and preferably a plurality of additional food product constituents, including at least one or more of the food product constituents disclosed hereinabove, which each provides or imparts a corresponding different one of nutrition, flavor, smell, aroma, texture, or mouthfeel to the resultant ready-to-eat harissa instantized extruded food product that is produced when water is added to the harissa instantized food product extrudate and mixed therewith. In one such method implementation and embodiment, the admixture also contains at least one and preferably a plurality of additional food product constituents, including one or more of which are disclosed elsewhere herein, including at least one food product constituent containing less than 5% starch by weight, which also each respectively provides or imparts a different one of nutrition, flavor, smell, aroma, texture, or mouthfeel to the resultant ready-to-eat harissa instantized extruded food product produced when water is added to the harissa instantized food product extrudate and mixed therewith. As previously indicated, such an admixture can also contain one or more and can even contain a plurality of pairs, at least three, of seasonings, spices and herbs, including one or more and even a plurality of pairs, at least three, of the seasonings, spices and herbs disclosed hereinabove.

In such a third preferred method and implementation, the granular, pelletized, powdered or flour harissa instantized food product extrudate provides a dry granular, pelletized, powdered or flour extruded instantized harissa food product base to which is blended at least one, and preferably a plurality of pairs, i.e., at least three, of dry or dried additional food product constituents, such as at least one or more of the food product constituents disclosed hereinabove, producing a ready-to-eat partially instantized harissa food product of the present invention when water, preferably hot water, more preferably boiling water, is added, which is a harissa porridge or harissa-type porridge that contains at least a plurality of pairs, i.e., of edible pieces or edible chunks of each one of the dry or dried additional food product constituents blended to the harissa instantized food product extrudate after extrusion. Each one of the dry or dried food product constituents blended with the dry granular, pelletized, powdered or flour extruded instantized food product base preferably is in the form of a dehydrated or freeze-dried food product constituent. When water, preferably warm or hot water, more preferably boiling water, is added to such a ready-to-eat partially instantized harissa food product of the present invention, the water instantizes the instantized harissa food product extrudate and rehydrates each piece or chunk of each one of the food product constituents blended with the instantized food product extrudate to produce another preferred ready-to-eat partially instantized harissa food product. In a preferred method implementation and embodiment, at least a plurality of pairs of dehydrated or freeze-dried cracked grains of wheat, whole grains of wheat or a combination of cracked grains of wheat and whole grains of wheat are blended with the harissa instantized food product extrudate to produce a further preferred ready-to-eat partially instantized harissa food product. The result when mixed with water is a wet mushy, lumpy porridge-like food product of the present invention in the form of a harissa porridge that can be scooped out of a bowl in which it is contained using a spoon, or even a fork, and eaten.

In another such preferred method implementation and embodiment of a harissa-type instantized food product extrudate and harissa-type extruded instantized food product of the present invention, at least one and preferably at least a plurality of pairs, i.e., at least three, of seasonings, spices, and/or herbs are also blended with the granular, pelletized, powdered or flour harissa instantized food product extrudate. Where the harissa instantized food product extrudate provides a dry or dried granular extruded instantized food product base like that disclosed in the preceding paragraph to which preferably is blended a plurality of pairs, i.e., at least three, of dry or dried additional food product constituents, such as at least one or more of the food product constituents disclosed hereinabove, at least one and preferably a plurality of pairs, i.e., at least three, of seasonings, spices and/or herb are also blended with the instantized food product extrudate either prior to, during or after blending of the at least one and preferably at least a plurality of pairs, i.e., at least three, of seasonings, spices and/or herbs. The dry or dried granular ready-to-eat partially instantized harissa food product resulting from carrying out one or more of the blending steps disclosed herein can be packaged, such as in a single serving tear-open gas-tight and water-tight pouch, such as discussed above, and/or in a multiple-serving container, in the form of a box, e.g., cardboard or paperboard box, a plastic container, a pressed-fiber container, or another type of container that can be of gas-tight and water-tight construction and which can be and preferably also is resealable.

In a fourth preferred implementation of a method of making an instantized extruded oatmeal food product and instantized oatmeal food product extrudate and an instantized extruded oatmeal food product and instantized oatmeal food product extrudate embodiment, the admixture is composed of a oats, such as a cracked oats, or preferably a whole grain oats, as the starch-containing material, to which is added at least one and preferably at least a plurality of spices, herbs and/or seasonings and which can and preferably also does contain some salt. This admixture also is extruded preferably using a single screw extruder at an ultrahigh extrusion pressure of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds thereby extruding an oatmeal instantized food product extrudate preferably in granular form that preferably is a ready-to-eat oatmeal instantized extruded food product which only requires water, preferably hot water, more preferably boiling water, to be added thereto and mixed therewith in order to be consumed by a person. The oatmeal instantized food product extrudate is comminuted into a granular or pelletized form during or upon extrusion and can also be further comminuted, such as by grinding or milling the granular or pelletized instantized food product extrudate into smaller more finely ground particles producing an oatmeal instantized food product extrudate powder or flour to which water, which can be room temperature water, but which preferably is hot water, more preferably boiling water, is added and mixed to produce an oatmeal instantized extruded food product in accordance with the present invention.

In a fourth such preferred implementation of a method of making an oatmeal instantized extruded food product and an oatmeal instantized food product extrudate and at least one embodiment thereof, the admixture from which the oatmeal instantized food product extrudate is extruded also contains at least one and preferably a plurality of additional food product constituents, including at least one or more of the food product constituents disclosed hereinabove, which each provides or imparts a corresponding different one of nutrition, flavor, smell, aroma, texture, or mouthfeel to the resultant ready-to-eat oatmeal instantized extruded food product that is produced when water is added to the oatmeal instantized food product extrudate and mixed therewith. In one such method implementation and embodiment, the admixture also contains at least one and preferably a plurality of additional food product constituents, including one or more of which are disclosed elsewhere herein, including at least one food product constituent containing less than 5% starch by weight, which also each respectively provides or imparts a different one of nutrition, flavor, smell, aroma, texture, or mouthfeel to the resultant ready-to-eat oatmeal instantized extruded food product produced when water is added to the oatmeal instantized food product extrudate and mixed therewith. As previously indicated, such an admixture can also contain one or more and can even contain a plurality of pairs, at least three, of seasonings, spices and herbs, including one or more and even a plurality of pairs, at least three, of the seasonings, spices and herbs disclosed hereinabove.

In such a fourth preferred method and implementation, the granular, pelletized, powdered or flour oatmeal instantized gelling food product extrudate provides a dry granular, pelletized, powdered or flour extruded instantized oatmeal food product base to which is blended at least one, and preferably a plurality of pairs, i.e., at least three, of dry or dried additional food product constituents, such as at least one or more of the food product constituents disclosed hereinabove, producing a ready-to-eat partially instantized oatmeal food product of the present invention when water, preferably hot water, more preferably boiling water, is added, which is an oatmeal porridge or oatmeal-type porridge that contains at least a plurality of pairs, i.e., of edible pieces or edible chunks of each one of the dry or dried additional food product constituents blended to the oatmeal instantized food product extrudate after extrusion. Each one of the dry or dried food product constituents blended with the dry granular, pelletized, powdered or flour extruded instantized oatmeal food product base preferably is in the form of a dehydrated or freeze-dried food product constituent. When water, preferably warm or hot water, more preferably boiling water, is added to such a ready-to-eat partially instantized oatmeal food product of the present invention, the water instantizes the instantized oatmeal food product extrudate and rehydrates each piece or chunk of each one of the food product constituents blended with the instantized food product extrudate to produce another preferred embodiment of a ready-to-eat partially instantized oatmeal food product. In a preferred method implementation and embodiment, at least a plurality of pairs of dehydrated or freeze-dried pieces of apple, banana, raisins, marshmallows or a combination of at least a plurality thereof are blended with the oatmeal instantized food product extrudate to produce a further preferred ready-to-eat partially instantized oatmeal food product. The result when mixed with water is a wet mushy, lumpy porridge-like food product of the present invention in the form of an oatmeal porridge that can be scooped out of a bowl in which it is contained using a spoon, or even a fork, and eaten.

In another such preferred method implementation and embodiment of an oatmeal-type instantized food product extrudate and oatmeal-type extruded instantized food product of the present invention, at least one and preferably at least a plurality of pairs, i.e., at least three, of seasonings, spices, and/or herbs are also blended with the granular, pelletized, powdered or flour oatmeal instantized food product extrudate. Where the oatmeal instantized food product extrudate provides a dry or dried granular extruded instantized food product base like that disclosed in the preceding paragraph to which preferably is blended a plurality of pairs, i.e., at least three, of dry or dried additional food product constituents, such as at least one or more of the food product constituents disclosed hereinabove, at least one and preferably a plurality of pairs, i.e., at least three, of seasonings, spices and/or herb are also blended with the instantized food product extrudate either prior to, during or after blending of the at least one and preferably at least a plurality of pairs, i.e., at least three, of seasonings, spices and/or herbs. The dry or dried granular ready-to-eat partially instantized oatmeal food product resulting from carrying out one or more of the steps disclosed hereinabove, including one or more of the blending steps disclosed hereinabove, can be packaged, such as in a single serving tear-open gas-tight and water-tight pouch, such as discussed above, and/or in a multiple-serving container, in the form of a box, e.g., cardboard or paperboard box, a plastic container, a pressed-fiber container, or another type of container that can be of gas-tight and water-tight construction and which can be and preferably also is resealable.

In a fifth preferred implementation of a method of making an instantized extruded polenta food product and instantized polenta food product extrudate and an instantized extruded polenta food product and instantized polenta food product extrudate embodiment, the admixture is composed of a meal of one or more cereal grains, such as preferably a cornmeal, to which is added at least one and preferably at least a plurality of spices, herbs and/or seasonings and which can and preferably also does contain some salt. This admixture is extruded preferably using a single screw extruder at an ultrahigh extrusion pressure of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds thereby extruding a polenta instantized food product extrudate preferably in granular form that preferably is a ready-to-eat polenta instantized extruded food product which only requires water, preferably hot water, more preferably boiling water, to be added thereto and mixed therewith in order to be consumed by a person. The polenta instantized food product extrudate is comminuted into a granular or pelletized form during or upon extrusion and can also be further comminuted, such as by grinding or milling the granular or pelletized instantized food product extrudate into smaller more finely ground particles producing a polenta instantized food product extrudate powder or flour to which water, which can be room temperature water, but which preferably is hot water, more preferably boiling water, is added and mixed to produce a polenta instantized extruded food product in accordance with the present invention.

In a fifth such preferred implementation of a method of making a polenta instantized extruded food product and a polenta instantized food product extrudate and at least one embodiment thereof, the admixture from which the polenta instantized food product extrudate is extruded also contains at least one and preferably a plurality of additional food product constituents, including at least one or more of the food product constituents disclosed hereinabove, which each provides or imparts a corresponding different one of nutrition, flavor, smell, aroma, texture, or mouthfeel to the resultant ready-to-eat polenta instantized extruded food product that is produced when water is added to the polenta instantized food product extrudate and mixed therewith. In one such method implementation and embodiment, the admixture also contains at least one and preferably a plurality of additional food product constituents, including one or more of which are disclosed elsewhere herein, including at least one food product constituent containing less than 5% starch by weight, which also each respectively provides or imparts a different one of nutrition, flavor, smell, aroma, texture, or mouthfeel to the resultant ready-to-eat polenta instantized extruded food product produced when water is added to the polenta instantized food product extrudate and mixed therewith. As previously indicated, such an admixture can also contain one or more and can even contain a plurality of pairs, at least three, of seasonings, spices and herbs, including one or more and even a plurality of pairs, at least three, of the seasonings, spices and herbs disclosed hereinabove.

In such a fifth preferred method and implementation, the granular, pelletized, powdered or flour polenta instantized food product extrudate provides a dry granular, pelletized, powdered or flour extruded instantized polenta food product base to which is blended at least one, and preferably a plurality of pairs, i.e., at least three, of dry or dried additional food product constituents, such as at least one or more of the food product constituents disclosed hereinabove, producing a ready-to-eat partially instantized polenta food product of the present invention when water, preferably hot water, more preferably boiling water, is added, which is an polenta porridge or polenta-type porridge that contains at least a plurality of pairs, i.e., of edible pieces or edible chunks of each one of the dry or dried additional food product constituents blended to the polenta instantized food product extrudate after extrusion. Each one of the dry or dried food product constituents blended with the dry granular, pelletized, powdered or flour extruded instantized polenta food product base preferably is in the form of a dehydrated or freeze-dried food product constituent. When water, preferably warm or hot water, more preferably boiling water, is added to such a ready-to-eat partially instantized polenta food product of the present invention, the water instantizes the instantized polenta food product extrudate and rehydrates each piece or chunk of each one of the food product constituents blended with the instantized food product extrudate to produce another preferred embodiment of a ready-to-eat partially instantized polenta food product. In a preferred method implementation and embodiment, at least a plurality of pairs of dehydrated or freeze-dried pieces of vegetables, fruits, meats, or a combination of at least a plurality thereof are blended with the polenta instantized food product extrudate to produce a further preferred ready-to-eat partially instantized polenta food product. The result when mixed with water is a wet mushy, lumpy porridge-like food product of the present invention in the form of an polenta porridge that can be scooped out of a bowl in which it is contained using a spoon, or even a fork, and eaten.

In another such preferred method implementation and embodiment of a polenta-type instantized food product extrudate and polenta-type extruded instantized food product of the present invention, at least one and preferably at least a plurality of pairs, i.e., at least three, of seasonings, spices, and/or herbs are also blended with the granular, pelletized, powdered or flour polenta instantized food product extrudate. Where the polenta instantized food product extrudate provides a dry or dried granular extruded instantized food product base like that disclosed in the preceding paragraph to which preferably is blended a plurality of pairs, i.e., at least three, of dry or dried additional food product constituents, such as at least one or more of the food product constituents disclosed hereinabove, at least one and preferably a plurality of pairs, i.e., at least three, of seasonings, spices and/or herb are also blended with the instantized food product extrudate either prior to, during or after blending of the at least one and preferably at least a plurality of pairs, i.e., at least three, of seasonings, spices and/or herbs. The dry or dried granular ready-to-eat partially instantized polenta food product resulting from carrying out one or more of the steps disclosed hereinabove, including one or more of the blending steps disclosed hereinabove, can be packaged, such as in a single serving tear-open gas-tight and water-tight pouch, such as discussed above, and/or in a multiple-serving container, in the form of a box, e.g., cardboard or paperboard box, a plastic container, a pressed-fiber container, or another type of container that can be of gas-tight and water-tight construction and which can be and preferably also is resealable.

In a sixth preferred implementation of a method of making an instantized extruded food product and instantized food product extrudate and an instantized extruded food product and instantized food product extrudate embodiment, the admixture is composed of a meal or flour of one or more cereal grains, such as preferably a cornmeal, a wheat flour, or a combination of cornmeal and wheat flour to which is added at least one and preferably at least a plurality of spices, herbs and/or seasonings and which can and preferably also does contain some salt. This admixture also is extruded preferably using a single screw extruder at an ultrahigh extrusion pressure of at least at least 2500 PSI, preferably at least 4000 PSI, and more preferably at least 5000 PSI for a residency time of no more than 15 seconds, preferably no more than 10 seconds, and more preferably no more than about 7 seconds±2 seconds thereby extruding a pudding instantized food product extrudate preferably in granular form that preferably is a ready-to-eat pudding instantized extruded food product which only requires water, preferably hot water, more preferably boiling water, to be added thereto and mixed therewith in order to be consumed by a person. The pudding instantized food product extrudate is comminuted into a granular or pelletized form during or upon extrusion and can also be further comminuted, such as by grinding or milling the granular or pelletized instantized food product extrudate into smaller more finely ground particles producing a pudding instantized food product extrudate powder or flour to which water, which can be room temperature water, but which preferably is hot water, more preferably boiling water, is added and mixed to produce a pudding instantized extruded food product, i.e., an instantized pudding, in accordance with the present invention.

In a fifth such preferred implementation of a method of making a pudding instantized extruded food product and a pudding instantized food product extrudate and at least one embodiment thereof, the admixture from which the pudding instantized food product extrudate is extruded also contains at least one and preferably a plurality of additional food product constituents, including at least one or more of the food product constituents disclosed hereinabove, which each provides or imparts a corresponding different one of nutrition, flavor, smell, aroma, texture, or mouthfeel to the resultant ready-to-eat pudding instantized extruded food product that is produced when water is added to the pudding instantized food product extrudate and mixed therewith. In one such method implementation and embodiment, the admixture also contains at least one and preferably a plurality of additional food product constituents, including one or more of which are disclosed elsewhere herein, including at least one food product constituent containing less than 5% starch by weight, which also each respectively provides or imparts a different one of nutrition, flavor, smell, aroma, texture, or mouthfeel to the resultant ready-to-eat pudding instantized extruded food product produced when water is added to the pudding instantized food product extrudate and mixed therewith. As previously indicated, such an admixture can also contain one or more and can even contain a plurality of pairs, at least three, of seasonings, spices and herbs, including one or more and even a plurality of pairs, at least three, of the seasonings, spices and herbs disclosed hereinabove.

In such a sixth preferred method and implementation, the granular, pelletized, powdered or flour pudding instantized food product extrudate provides a dry granular, pelletized, powdered or flour extruded instantized pudding food product base to which is blended at least one, and preferably a plurality of pairs, i.e., at least three, of dry or dried additional food product constituents, such as at least one or more of the food product constituents disclosed hereinabove, producing a ready-to-eat partially instantized pudding food product of the present invention when water, preferably hot water, more preferably boiling water, is added, which is an instantizable pudding or instantized pudding that contains at least a plurality of pairs, i.e., of edible pieces or edible chunks of each one of the dry or dried additional food product constituents blended to the pudding instantized food product extrudate after extrusion. Each one of the dry or dried food product constituents blended with the dry granular, pelletized, powdered or flour extruded instantized pudding food product base preferably is in the form of a dehydrated or freeze-dried food product constituent. When water, preferably warm or hot water, more preferably boiling water, is added to such a ready-to-eat partially instantized pudding food product of the present invention, the water instantizes the instantized pudding food product extrudate and rehydrates each piece or chunk of each one of the food product constituents blended with the instantized food product extrudate to produce another preferred embodiment of a ready-to-eat partially instantized pudding food product of the present invention. In a preferred method implementation and embodiment, at least a plurality of pairs of dehydrated or freeze-dried pieces of fruits of at least a plurality thereof are blended with the pudding instantized food product extrudate to produce a further preferred ready-to-eat partially instantized pudding food product. The result when mixed with water is a wet mushy, lumpy porridge-like food product of the present invention in the form of a viscous flowable and scoopable pudding that can be scooped out of a bowl in which it is contained using a spoon, or even a fork, and eaten.

In another such preferred method implementation and embodiment of a pudding instantized food product extrudate and extruded instantized pudding food product of the present invention, at least one and preferably at least a plurality of pairs, i.e., at least three, of seasonings, spices, and/or herbs are also blended with the granular, pelletized, powdered or flour pudding instantized food product extrudate. Where the pudding instantized food product extrudate provides a dry or dried granular extruded instantized food product base like that disclosed in the preceding paragraph to which preferably is blended a plurality of pairs, i.e., at least three, of dry or dried additional food product constituents, such as at least one or more of the food product constituents disclosed hereinabove, at least one and preferably a plurality of pairs, i.e., at least three, of seasonings, spices and/or herb are also blended with the instantized food product extrudate either prior to, during or after blending of the at least one and preferably at least a plurality of pairs, i.e., at least three, of seasonings, spices and/or herbs. The dry or dried granular ready-to-eat partially instantized pudding food product resulting from carrying out one or more of the steps disclosed hereinabove, including one or more of the blending steps disclosed hereinabove, can be packaged, such as in a single serving tear-open gas-tight and water-tight pouch, such as discussed above, and/or in a multiple-serving container, in the form of a box, e.g., cardboard or paperboard box, a plastic container, a pressed-fiber container, or another type of container that can be of gas-tight and water-tight construction and which can be and preferably also is resealable.

In accordance with that discussed above, an instantized food product extrudate and extruded instantized food product of the present invention and method making the same using ultrahigh pressure extrusion in accordance with that disclose hereinabove can be configured to make a congee porridge or congee-type porridge, a harissa porridge or harissa-type porridge, an oatmeal porridge or oatmeal-type porridge, a genfo porridge or genfo-type porridge, a polenta porridge or a polenta-type porridge, a gruel porridge or a gruel-type porridge, a grits porridge or a grits-type porridge, and a pudding porridge, e.g., a pudding such as a hasty pudding. From the above, the present method of making such an instantized food product extrudate and extruded instantized food product of the present invention can be used with starch-containing admixtures formulated differently than disclosed above but which produces a granular, particulate, powdered or flour instantized food product extrudate that can be and preferably is formulated as a meal ready-to-eat (MRE) which only requires the addition of water and mixed therewith.

In a preferred embodiment, equal parts water and instantized food product extrudate are provided, e.g., added, and mixed together to produce an extruded instantized food product of the present invention that can be a MRE has a viscosity of at least 150,000 centipoise and preferably has a viscosity of no greater than 300,000 centipoise after being wetted with water and the water thoroughly mixed therewith. In another preferred embodiment, at least two parts water are mixed with one part instantized food product extrudate to produce a more flowable, less viscous extruded instantized food product of the present invention that can be a MRE, which preferably has a viscosity of at least 70,000 centipoise and preferably has a viscosity of no greater than 140,000 centipoise after being wetted with water such that the water and extrudate are thoroughly mixed together. In still another preferred embodiment, at least three parts water are mixed with one part instantized food product extrudate to produce an even more flowable, less viscous extruded instantized food product of the present invention and which also can be a MRE, which preferably has a viscosity of at least 20,000 centipoise and preferably has a viscosity of no great than 60,000 centipoise.

In such preferred embodiments, water is mixed with the instantized food product extrudate at a corresponding designated amount of water in relation to a corresponding designated amount of the instantized food product extrudate and/or ratio of parts water to instantized food product extrudate until a substantially homogenous or generally uniform mixture is produced that is the ready-to-eat extruded instantized food product of the present invention is produced. In another preferred method implementation, an ever increasing volume of water is added to an amount or mass of instantized food product extrudate and mixed therewith, preferably by manually stirring the water-instantized food product extrudate mixture until a substantially homogenous mixture or slurry of ready-to-eat extruded instantized food product is formed.

Current wet baby foods are typically made of a semisolid puree of one or more fruits or vegetables. Purees are produced by fine grinding to produce a pulp of fruit or vegetable solids and juice. Traditionally, infant foods were made by long cooking of whole fruits and vegetables, followed by pulping, usually in a paddle finisher. The cooking softened the materials so they could be forced through the screen of the finisher. Seeds, skins, and stems were left behind on the screen. Cooking was by direct contact with steam in long vessels. Condensate contained large amounts of soluble solids, reducing yield and generating a strong waste stream. The extended cooking also reduced vitamin content and developed less desirable flavor and color.

In an improved pureeing process, fruits and vegetables used in the puree are ground before they are cooked, producing a coarse puree which is then heated quickly to inactivate degradative enzymes. The puree passes through a second extractor to further reduce the particle size and then is pumped to batch tanks for filling. This shorter cooking process exposes fruit and vegetable purees to less heat, resulting in improved retention of flavor and color.

Traditionally, infant food purees have been retorted or hot-filled in glass jars. This remains the case with baby food puree products containing larger particles sizes, although some of these are now being packaged in plastic bowls or trays. More recently, aseptically processed purees for infants using aseptic plastic packaging typically consisting of either fruit purees or vegetable purees in multipack plastic containers or multipack plastic dishes.

The present-day focus has been to develop an ever-wider range of pureed baby food offerings made with types of fruits and other natural ingredients not heretofore used in wet baby foods to improve the nutritional value of baby food. In this regard, the present invention is therefore directed to a wet semisolid baby food not made of any puree that is composed of a pregelatinized extrudate that has a taste, consistency, texture, and mouthfeel similar to and preferably substantially the same as a pureed semisolid baby food. A preferred embodiment of such a non-pureed wet semisolid baby food product of the present invention has an extruded pregelatinized starch baby food product base to which one or more other ingredients, such as one or more fruits and/or one or more vegetables, can be and preferably are added either before, during, or after extrusion of the base.

In a preferred method, the extruded pregelatinized starch baby food product base is extruded from a starch-containing admixture under a high enough extrusion to modify, preferably physically modify, at least some of the starch in the admixture into a pregelatinized starch producing an extruded pregelatinized starch containing baby food product base that is composed of solid pellets or granules to which water is added and mixed to produce a finished wet semisolid non-pureed extruded baby food product of the present invention. The starch-containing admixture is composed of at least one cereal grain, lentil, and/or legume that preferably in its whole grain form so that the fiber in the at least one whole grain cereal grain, whole grain lentil, and/or whole grain legume is uniformly distributed throughout the granular extruded pregelatinized starch containing baby food product base that helps form a finished wet semisolid baby food product that is a stable emulsion when water is added and mixed therewith, preferably using a high shear mixer. The uniform distribution of the fiber from the whole grains of the admixture help promote the stability of the emulsion when water is added and mixed with a high shear mixer or the like producing a finished wet semisolid baby food product in the form of such an emulsion.

The present invention also is directed to a method of making a wet semisolid baby food composed of an extruded pregelatinized starch baby food product base to which at least one or more ingredients, such as one or more fruits and/or one or more vegetables, are added either before, during or after extrusion, thereby producing a finished wet semisolid baby food product in accordance with the present invention which has a taste, consistency, texture and mouthfeel similar to and preferably substantially the same as a pureed semisolid baby food. The present invention is further directed to a method of making a wet semisolid non-pureed baby food composed of an extruded pregelatinized starch baby food product base to which at least one or more ingredients, such as one or more fruits and/or one or more vegetables, are added either before, during, or after extrusion, thereby producing a finished non-pureed wet semisolid baby food product in accordance with the present invention which has a taste, consistency, texture and mouthfeel similar to and preferably substantially the same as a pureed semisolid baby food.

In such a preferred method of making a wet semisolid baby food product of the present invention, an extruded baby food product base of the present invention is composed of solid granular baby food product base extrudate composed of a cold water soluble pregelatinized starch formed of starch modified, preferably physically modified, during extrusion that produces a finished wet semisolid baby food product in the form an emulsion when water is added and mixed with the solid granular baby food product base extrudate. The pregelatinized starch of the solid granular baby food product base extrudate preferably forms one or both of a dispersed starch gel and a hydrocolloid gel that preferably is a self-gelling hydrocolloid gel when water is added and mixed therewith, such as preferably using a high shear mixer, which thereby helps form the emulsion of the wet semisolid baby food product after water is added and mixed therewith. As discussed in more detail elsewhere herein, the solid granular baby food product base extrudate is further composed of fiber, preferably insoluble fiber and/or resistant starch, substantially uniformly distributed throughout the solid granular baby food product base extrudate that helps promote stability of the emulsion of the emulsion of the wet semisolid baby food product formed when water is added and mixed the solid granular baby food product base extrudate.

A preferred extruded baby food product base of the present invention composed of a pregelatinized starch extrudate is produced by extruding a starch-containing admixture having a moisture content of no more than twenty-five percent, preferably no more than twenty percent, more preferably no more than about eighteen percent, using an extruder that preferably is a single screw extruder that subjects the starch-containing admixture to an extrusion pressure of at least 2000 PSI, preferably at least 3000 PSI, more preferably at least 5000 PSI, for a sufficiently long enough residency time within the extruder of no more than twenty seconds, preferably no more than ten seconds, and more preferably between about four seconds and about eight seconds to cause at least some of the starch in the admixture to be modified, preferably physically modified, during ultrahigh pressure extrusion into a water-soluble pregelatinized starch of the resultant pregelatinized starch containing self-gelling baby food product base extrudate discharged from the extruder that preferably is a cold water-soluble pregelatinized starch that solubilizes or dissolves in room temperature water. Upon extrusion, the pregelatinized starch extrudate that is composed of the cold water-soluble pregelatinized starch preferably is cooled and dried without the application of heat to preserve by substantially completely freezing the state of the pregelatinized starch in the pregelatinized extrudate to prevent the pregelatinized starch from subsequently retrograding before water is added and mixed therewith to form a wet semisolid extruded baby food product of the invention that is packaged in bottles, plastic containers, e.g. single serving cups, or prepackaged plastic dishes for consumer purchase and use.

In one preferred method implementation and embodiment, the starch-containing admixture is comprised of at least one starch-containing cereal grain, preferably sorghum, wheat, oats, barley, corn, or rye each of which preferably is a whole grain cereal grain, preferably whole grain sorghum, wheat, oats, barley, corn, or rye, so that the fiber from the whole grain of each cereal grain in the admixture that is extruded by the extruder, preferably single screw extruder, under ultrahigh extrusion pressure preferably is substantially uniformly or homogenously distributed throughout the resultant granular pregelatinized starch-containing baby food product base extrudate discharged from the extruder, with the presence of the uniformly distributed fiber that produces when water is mixed with the granular extrudate a finished wet semisolid baby food product that is a thermally stable and shelf stable emulsion having a long shelf life of at least six months, preferably at least one year, and more preferably at least two years before any of the ingredients, constituents or components of the emulsion separate therefrom or precipitate out of the emulsion. In another preferred method implementation and embodiment, the starch-containing admixture is comprised of at least one starch-containing legume, preferably chickpea, chick pea, yellow pea, pea, navy bean, or bean, each of which preferably is a whole grain legume or fiber-containing legume, preferably whole grain chickpea, whole grain chick pea, whole grain yellow pea, whole grain pea, whole grain navy bean, or whole grain bean, so that the fiber from the whole grain of each legume in the admixture that is extruded by the extruder, preferably single screw extruder, under ultrahigh extrusion pressure preferably is substantially uniformly or homogenously distributed throughout the resultant granular pregelatinized starch-containing baby food product base extrudate discharged from the extruder, with the presence of the uniformly distributed fiber that produces when water is mixed with the granular extrudate a finished wet semisolid baby food product that is a thermally stable and shelf stable emulsion having a long shelf life of at least six months, preferably at least one year, and more preferably at least two years before any of the ingredients, constituents or components of the emulsion separate therefrom or precipitate out of the emulsion.

Upon extrusion and prior to cooling and drying the pregelatinized gelling extrudate without heating the pregelatinized extrudate, the pregelatinized extrudate that forms the extruded baby food product base is comminuted into pellets or granules, such as by using a high-speed rotary knife or cutter to which water can be added and mixed therewith, such with a high shear mixer, to produce a preferred embodiment of an extruded baby food product of the present invention before or upon being packaged in bottles, plastic containers, e.g. single serving cups, or prepackaged plastic dishes. Before the step where water is added and mixed with the pregelatinized extrudate pellets or pregelatinized extrudate granules, these pregelatinized extrudate pellets or pregelatinized extrudate granules define one preferred embodiment of a dry granular pregelatinized extruded baby food product base of the present invention. One or more additional ingredients, preferably one or more fruits or one or more vegetables, can be added to or blended with the pellets or granules of the dry granular extruded baby food product base before or during the step where water is added and mixed therewith, such as by using a blender or mixer, preferably a high shear mixer, thereby producing another preferred embodiment of a wet semisolid extruded baby food product of the present invention that can also be and preferably is packaged in bottles, plastic containers, e.g. single serving cups, or prepackaged plastic dishes.

In another preferred method implementation and embodiment where one or more additional ingredients, such as preferably one or more fruits or one or more vegetables, are added, the one or more additional ingredients are blended or mixed with the pregelatinized extrudate pellets or pregelatinized extrudate granules to form a second admixture which is in turn extruded by the extruder, preferably single screw extruder, at an extrusion pressure of at least 2000 PSI, preferably at least 3000 PSI, more preferably at least 5000 PSI, producing a two-pass pregelatinized baby food product base extrudate of the present invention containing both the pregelatinized starch and each added ingredient substantially uniformly distributed throughout the two-pass pregelatinized baby food product base extrudate. The two-pass pregelatinized baby food product base extrudate preferably is comminuted upon being extruded from the extruder, such as by being cut into pellets or granules of a granular two-pass pregelatinized extruded baby food product base by a rotary knife or cutter as the extrudate is discharged from perforate die holes of a perforate extrusion die at a discharge end of the extruder. Water can be added and mixed therewith, preferably using a high shear mixer, producing another preferred embodiment of a wet semisolid finished extruded baby food product that can be and preferably is packaged in bottles, plastic containers, e.g., single serving cups, or prepackaged plastic dishes for retail sale and consumer use. As discussed in more detail below, a further one or more additional ingredients, including one or more fruits or vegetables, can be added to the two-pass pregelatinized extruded pellets or granules, even if one or more ingredients were added to the prior pregelatinized pellets or granules from the first extrusion pass, before water is added and mixed therewith, preferably using a high shear mixer, to produce a further preferred embodiment of a finished wet semisolid extruded baby food product of the present invention that can be and preferably is packaged in bottles, plastic containers, e.g., single serving cups, or prepackaged plastic dishes for consumer sale and use.

In another preferred method and embodiment, the pellets or granules of the pregelatinized extruded baby food product base are further comminuted, such as by milling or grinding the pregelatinized extrudate pellets or pregelatinized extrudate granules into smaller more finely sized comminuted pregelatinized extrudate particles having a particle size or particle size range of a meal, powder, or flour configured to impart to the final or finished wet semisolid extruded baby food product at least one of, preferably a plurality of, more preferably a plurality of pairs, i.e. at least three, of a desired consistency, desired texture and desired mouthfeel. In such a preferred method and embodiment, the pregelatinized extrudate pellets or pregelatinized extrudate granules are further comminuted into even smaller more finely sized particles having the consistency of a powder or flour before water is added and mixed therewith, such as by using a blender or mixer, preferably a high shear mixer, and the resultant wet semisolid mixture, preferably emulsion, is packaged in bottles, plastic containers, e.g. single serving cups, or prepackaged plastic dishes. In another such preferred method and embodiment, one or more additional ingredients that preferably are one or more fruits or one or more vegetables are blended or mixed with the pregelatinized extrudate pellets or pregelatinized extrudate granules prior to being further comminuted by grinding or milling into smaller more finely sized particles.

In a preferred method implementation and embodiment, the extruded baby food product base is substantially completely composed of the cold water-soluble pregelatinized extrudate, but which can also include one or more ingredients, such as one or more fruits and/or vegetables, which can be added to the starch-containing admixture such that each ingredient added to the admixture becomes substantially uniformly distributed throughout the pregelatinized extrudate baby food product base. Where each one of the additional ingredients is added to the admixture and extruded together with the starch-containing material of the admixture, the resultant pregelatinized extrudate that is formed having each ingredient added to the admixture substantially uniformly distributed throughout the extrudate produces an extruded baby food product base that only needs water to be added and mixed therewith to form a wet semisolid extruded baby food product that is a complete and finished baby food product in accordance with one embodiment of the present invention.

Another aspect of the present invention is the making of a wet semisolid baby food using an extruder that has a taste, texture, consistency and mouthfeel similar to that of a pureed wet semisolid baby food without the need to resort to the multiple time consuming and costly process steps that a conventional pureed baby food product making process requires.

The present invention is therefore directed to an improved method and embodiment of making a semisolid baby food product utilizing a pregelatinized gelling or self-gelling baby food product base extrudate as a base or component thereof in accordance with the present invention that is a non-pureed emulsion formed of water-wetted pregelatinized starch whose emulsion matrix is stabilized by fiber from the whole grain cereal grains, whole grain legumes, and/or whole grain lentils of the admixture from which the pregelatinized baby food product base extrudate was extruded under an ultrahigh extrusion pressure.

Prior attempts to make a wet semisolid baby food product containing green banana powder were limited to only being able to contain between 4%-5% starch-containing green banana powder by weight of the wet semisolid baby food product before excess green banana powder beyond the 5% threshold would precipitate out. To obtain a baby food product containing a greater weight percentage of starch-containing green banana powder, an admixture moisture content of between 15% and 20%, preferably about 17%±1%, that contained equal parts of (a) starch-containing green banana powder, and (b) at least one or more whole grain starch-containing cereal grains, such as preferably sorghum and/or barley, whole grain starch-containing legumes, such as preferably chickpea and/or navy bean, and/or whole grain starch-containing lentils, were extruded using a single screw extruder that subjected the admixture to an ultrahigh pressure extrusion of at least 2000 PSI and preferably at least 3000 PSI, for a residency time of between four and eight seconds, preferably between five and six seconds, forming a granular extrudate that was subsequently dried and cooled without the application of heat by using turbulently flowing room temperature air to produce a solid granular extruded pregelatinized starch-containing baby food product base. Water was added to the solid granular extruded pregelatinized starch-containing baby food product base and mixed therewith using a blender, mixer, sonicator or the like that produced high shear mixing of the water with the solid granular extruded pregelatinized starch-containing baby food product base producing a final or finished wet semisolid baby food product emulsion that was both thermally stable and shelf stable having a shelf life when packaged in bottles, plastic containers, or plastic dishes for consumer sale and use of at least six months, preferably at least one year, and more preferably at least two years without anything settling out of the emulsion.

In one such preferred embodiment, the admixture is composed up to 50% by dry admixture weight (before any water is added) of banana flour with the remainder of the admixture composed of one or more other constituents, such as a starchy vegetable, such as beet or beetroot, sweet potato, or another starchy vegetable which contains at least 7% by weight of starch, and/or a cereal grain, such as sorghum, wheat, barley, or corn, which contains greater than 25% starch by weight, to which moisture, e.g., water, is added in an amount to bring the total or final moisture content of the admixture entering the extruder to between 15% and 20% total admixture moisture content, preferably about 17%±2% total moisture content. In one such preferred embodiment, the admixture is composed of between 15% and 50% by dry admixture weight of a granular starch-containing fruit, which can be a starch-containing berry, which preferably is comminuted into a granular form, e.g., starch-containing fruit granules or grits or starch-containing berry granules or grits, a flour, e.g., a starch-containing fruit powder or starch-containing berry flour, and the remainder of the dry admixture composed of at least one of (a) starchy vegetable having a starch content of at least 7% by weight of the starchy vegetable, and (b) a starch-containing grain that preferably is a cereal grain containing at least 25% starch by weight, to which moisture, e.g., water, is added if needed to obtain a final admixture moisture content of the final admixture entering the extruder of between 15% and 20% and preferably no more than about 17%±1%. In such a preferred embodiment, the admixture is composed of between 15% and 50% by dry admixture weight of a granular starch-containing fruit from the musa family, which preferably can be a banana or plaintain which can be a starch-containing berry, which preferably is comminuted into a granular form, e.g., starch-containing fruit granules or grits or starch-containing berry granules or grits, a flour, e.g., a starch-containing fruit powder or starch-containing berry flour, and the remainder of the dry admixture composed of at least one of (a) starchy vegetable having a starch content of at least 7% by weight of the starchy vegetable, and (b) a starch-containing grain that preferably is a cereal grain containing at least 25% starch by weight, to which moisture, e.g., water, is added if needed to obtain a final admixture moisture content of the final admixture entering the extruder of between 15% and 20% and preferably no more than about 17%±1%.

The admixture is extruded at an ultrahigh extruder pressure of at least 2000 PSI, preferably at least 4000 PSI, and more preferably at an extrusion pressure of at least 7000 PSI, at extrusion temperature of at least 100° Fahrenheit, preferably at least 125°, more preferably at least about 135° Fahrenheit±25° Fahrenheit, producing a food product extrudate in accordance with present invention that is dried and cooled immediately after extrusion, without heating the food extrudate during drying and cooling of the food product extrudate, thereby producing a dried and cooled food extrudate of the present invention having a moisture content of between 5% and 15% moisture, preferably between 6% and 10% moisture content, and more preferably having between 6% and 8% moisture content. The resultant food extrudate can be and preferably is in a granular form, such as by being comminuted by a rotary blade or rotary knife during or after extrusion from the extruder. The remainder of the admixture can be composed of one or more of beans, sweet potato, sorghum, a starch vegetable containing at least 5% starch by weight, a starchy fruit containing at least 5% starch by weight, In another preferred embodiment, the admixture was of between 15% and 50% by dry admixture weight of green banana flour with the remainder of the admixture composed of one or more other constituents, such as beet, sweet potato, sorghum or another starchy vegetable, cereal grain, starchy root, or a starchy tuber.

An edible non-dairy cheese that can be a non-dairy vegan cheese can be made by extruding chickpea, yellow pea, and/or one or more other pulses under ultrahigh pressure extrusion producing a self-gelling extrudate in accordance with that disclosed hereinabove. Based on the ratio of water to the chickpea and yellow pea extrudate, an ultrahigh pressure extruded admixture containing at least 10% and preferably between 10% and 25% of the extruded chickpea or the extruded yellow pea produces an edible gel that is sliceable gel having a cheese-like viscosity and one or more of a cheese-like texture, a cheese-like taste, and a cheese-like mouthfeel. Variable flavor profiles can be used to flavor into a cheddar or mozzarella flavored cheese substitute. A fat, such as preferably sunflower oil, coconut oil, deodorized cocoa butter, lecithin, retains water and maintains the other constituents in stable suspension forming a thermally stable and shelf stable suspension that preferably is gel formed of one of a suspended starch, preferably suspended pregelatinized starch, and a hydrocolloid composed of starches modified, preferably physically modified during ultrahigh pressure extrusion, into polymers which proteins from the cereal grains, pulses, legumes and/or lentils in the admixture, preferably also modified during ultrahigh pressure extrusion cross-link the physically modified starch polymers forming a hydrocolloid gel that is advantageously self-gelling. At least the hydrocolloid gel component, preferably the self-gelling component, is thermoreversible such that the gel is a thermoreversible gel that re-cros slinks upon or after reheating as a result of the pregel starch fraction and the crosslinking protein fraction via modified kafirin modified during ultrahigh pressure extrusion where sorghum is extruded or via modified zein modified during ultrahigh pressure extrusion where corn is extruded. Granular or flour chickpea or yellow pea gelling extrudate preferably is used for the admixture used to make the cheese substitute that is dairy-free and preferably also vegan. Based on the volume of water added, the extrudate gels very very quickly into a sliceable cheese-like product. About 15% of the gelling extrudate and the remainder being water produces a sliceable gel that is of cheese-like viscosity and consistency. Can also be used to make a non-dairy whipped cream or non-dairy yogurt.

All of the conventional non-dairy milks that use an oat milk based remove fiber and protein with enzyme cooking and filtration thereby using amylase as the enzyme during cooking to create non-thickened starch base. The present invention eliminate the use of these bases by extruding whole grains of cereal grains and/legumes under ultrahigh extrusion pressure in accordance with the methods, formulations and embodiments disclosed hereinabove that have all protein and fiber remaining in the admixture that is extruded under ultrahigh extrusion pressure. Retaining fiber helps with suspension of ingredients in the food emulsion and thereby prevents the ingredients from coming out of the suspension. In one preferred embodiment, a combination of xanthan gum, carrageenan, and guar gum is added in an amount of 0.1% or less to the gelling food product constituent extrudate that gets comminuted into smaller more finely sized particles having the size of grits, powder or flour that is mixed with water using a high shear mixture in making a non-dairy or vegan non-dairy milk, a non-dairy or vegan non-dairy cream, a non-dairy or vegan non-dairy cream cheese, and a non-dairy or vegan non-dairy cheese instead of 2%-3% of the same three gum combination that is normally required to make the same conventional non-dairy milk, non-dairy cream, non-dairy cheese and non-dairy ice cream substitutes. Otherwise, prior art products use a gellan gum or pectin, but that adversely impacts mouthfeel but food products made with gelling food product constituent extrudates made in accordance with the methods and formulations disclosed herein produce non-dairy and vegan non-dairy milk, cream, cheese, yogurt, and ice cream advantageously have the same or substantially the same texture, consistency, flavor, aroma and mouthfeel as conventional dairy milk, dairy cream, dairy cheeses, and dairy ice creams. Conventional non-dairy or vegan non-dairy milk, cream, creamer and yogurt substitutes require shaking, but the presence of fiber and resistant starch by extruding under ultrahigh pressures admixtures containing whole grain cereal grains, including sorghum, oats, barley, wheat and/or corn, and legumes, including pulses, whole grain or whole seed chickpea, whole grain or whole seed yellow pea, and whole grain or whole seed lentils using ultrahigh pressure produces single component and dual-component gelling food product constituents in accordance with the present invention used as an ingredient in making non-dairy or vegan non-dairy milks, creams, butters, creamers and yogurts advantageously produce non-dairy or vegan non-dairy milks, non-dairy or vegan non-dairy creams, non-dairy or vegan non-dairy butters, non-dairy or vegan non-dairy creamers and non-dairy or vegan non-dairy yogurts where all of the constituents or ingredients thereof stably remain in suspension in the corresponding resultant food emulsions respectively produced for each that can remain refrigerated for at least a plurality of days, preferably at least a plurality of pairs of days without requiring shaking them before consuming them. In a preferred embodiment, ultrahigh pressure extrusion of a gelling food product constituent admixture from a chickpea admixture composed substantially completely of whole grain or whole seed yellow pea is a thickening agent or viscosity control agent when used as an ingredient in pudding of at least 1% by pudding weight, preferably at least 2% by pudding weight thereby eliminating the need for any pectins to be added as an ingredient thereto. Gelling food product constituent extrudate extruded of a sorghum admixture is used as an ingredient in ice cream to nucleate or crystallize ice along with fava bean protein to provide ice crystallization control to make ice cream scoopable at the right temperature or within a desired range of temperatures close to but below freezing temperature of 32° Fahrenheit. In one preferred method and embodiment, fava bean is added to the sorghum admixture and extruded under ultrahigh extrusion pressure at such a short residency time in accordance with the extrusion methods disclosed hereinabove producing a gelling food product constituent extrudate containing the fava bean uniformly distributed throughout the extrudate or extruded food product constituent composed of the gelling extrudate. In another preferred method and embodiment, the fava bean is dried or dehydrated and added to the gelling extrudate or extruded gelling food product constituent in granular form that preferably is in grit form, powdered form, or flour form with the granular fava bean substantially uniformly blended therewith. In another preferred embodiment, a pregelatinized flour composed of a whole grain sorghum, whole grain wheat, whole grain barley, and/or whole grain oats is extruded under ultrahigh extrusion pressures at low residency times producing a pregelatinized gelling functional flour of the present invention composed of gelling food product constituent extrudate comminuted into flour form to which granular fava bean preferably also comminuted into a flour is substantially uniformly blended therewith producing an extruded pregelatinized gelling flour in accordance with another aspect of the present invention having increased protein without impacting the flavor of food products made by mixing with water along with at least one other ingredient, preferably at least a plurality of other ingredients, including one or more of fruit, chocolate, shortening, grains, berries, ground meat, ground chicken, ground pork, ground fish, and/or other ingredients, forming it into a plurality of food products, and cooking or baking them in an oven at a temperature of at least 200° Fahrenheit, preferably at least 300° Fahrenheit, or another suitable baking or cooking temperature until fully baked or cooked into hardened food products.

Present invention encompasses a two gel component food product constituent: (1) starch suspended in water via high shear mixing, and (2) protein(s) modified by extrusion crosslink modified starch producing a self-gelling component of the gel. Can be applied onto a slug or blank of a multiple-ingredient food product constituent disposed on a sheet, tray or screen that migrates into the slug or blank thereafter and which dries thereby solidifying the slug or blank into a solidified crunchy food product preformed chip, cracker, bar, brownie, and which can be heated to cure the water-soluble modified starch binder. The present invention also encompasses a ready to eat extruded instantized food product made of granular gelling food product constituent extrudate to which water is added to make a ready to eat meal. The present invention further encompasses a dry granular porridge, dry granular edible grits, a dry granular pudding, a dry granular gruel, a dry granular instantized oatmeal, a dry granular oatmeal substitute or another similar type of granular dry food product precursor made with either (a) a granular extruded food product constituent composed of a gelling food product constituent extrudate of the present invention as one ingredient, or (b) a gelling food product constituent extrudate of the present invention as one ingredient along with a plurality of other ingredients, including one or more of a vegetable, fruit, or grain, one or more or all of which can be in whole or comminuted, e.g., milled, form, in the form of a dry granular, powdered or flourlike mixture that comprises an add-water-ready-to-eat food product that becomes a wet edible semisolid when water is added and thoroughly manually mixed therewith using a stirrer, knife, fork or spoon, immediately prior to being eaten.

The present invention is directed to a food product composed of a plurality of pairs of constituents, the food product including (a) a first food product constituent that provides at least one of nutrition, taste, flavor, flavor intensity, smell, aroma, texture, and mouthfeel; (b) a second food product constituent that provides at least one of nutrition, taste, flavor, flavor intensity, smell, aroma, texture, and mouthfeel, (c) a third food product constituent containing a pregelatinized flour that includes a water-soluble modified starch binder formed of starch modified during extrusion into the extrusion-modified pregelatinized starch that includes the binder when wetted with water, the third food product constituent comprising a pregelatinized flour that comprises a binder when wetted with water and mixed with the first food product constituent, and water is added to and mixed the first, second and third food product constituents to produce a shelf-stable emulsion comprising the food product. The first, second and third food product constituents can be mixed together using a blender or mixer. The first, second and third food product constituents can be mixed together using a high shear mixer.

The present invention also is directed to a food product composed of a plurality of pairs of constituents, the food product including (a) a first food product constituent that provides at least one of nutrition, taste, flavor, flavor intensity, smell, aroma, texture, and mouthfeel, (b) a second food product constituent that provides at least one of nutrition, taste, flavor, flavor intensity, smell, aroma, texture, and mouthfeel, and (c) a third food product constituent that includes a food product constituent-binding flour containing starch modified during extrusion into a water-soluble binder, and the food product-constituent binding flour binding together the first food product constituent and the second food product constituent when mixed together with water. The food product constituent binding flour is made of a starch-containing admixture extruded under a high enough extrusion pressure such that at least some of the starch in the admixture is modified into a cold water soluble binder that binds together the first food product constituent and the second food product constituent when a mixture of the first food product constituent, the second food product constituent, and the food product constituent binding flour is mixed together. The first food product constituent and the second food product constituent are bound together by mixing the first food product constituent, the second food product constituent, and the food product constituent binding flour with water producing a food product mixture that is dried to form the food product. The food product formed after drying the food product mixture can be a solid edible food snack that is one of a chip, a baked chip, a tortilla chip, a gluten-free tortilla chip, a baked tortilla chip, a baked gluten-free tortilla chip, a grain-free tortilla chip, a baked grain-free tortilla, a gluten-free grain-free tortilla chip, a cracker, a baked cracker, a gluten-free cracker, a baked gluten-free cracker, a grain-free cracker, a baked grain-free cracker, a gluten-free grain-free cracker, a baked gluten-free grain-free cracker, a crisp, a baked crisp, a gluten-free crisp, a baked gluten-free crisp, a potato crisp, and a baked potato crisp. The food product also can be a solid edible food snack that is one of a snack bar, a baked snack bar, a gluten-free snack bar, a baked gluten-free snack bar, a grain free snack bar, a baked grain-free snack bar, a gluten-free grain-free snack bar, a granola bar, a baked granola bar, a gluten-free granola bar, and a baked gluten-free granola bar.

Another aspect of the present invention is an extruded gelling or self-gelling food product or extruded food product constituent that can be and preferably is used as an ingredient of a food product is a two-pass extrudate where the starch-containing admixture run through the extruder at an ultrahigh extrusion pressure of at least 2000 PSI, preferably at least 3000 PSI, more preferably at least 4000 PSI, and even more preferably at least 5000 PSI, produces an extrudate containing starch modified, preferably physically modified during extrusion into a pregelatinized starch that is then made part of another starch-containing admixture containing one or more food ingredients, such as cocoa, chocolate, milk proteins, fruit, and/or vegetables, which is configured for a second pass through the extruder at such an ultrahigh extrusion pressure. By the second extrusion pass admixture containing the pregelatinized starch from the first extrusion pass extrudate from the first extrusion pass admixture, the presence of the pregelatinized starch in the second extrusion pass admixture instantly gelatinizes upon contacting water, e.g., water, steam, water, vapor, etc., within the extruder as it does not need to be subjected to the heat and pressure within the extruder ordinarily required for starch gelatinization. The presence of the pregelatinized starch that instantly gelatinizes upon contact with water in the extruder causes the entire second extrusion pass admixture to require less energy to flow through the extruder and flow through the extruder with less resistance with the non-gelatinized portion of the second extrusion pass admixture suspended within the fluidized instantly gelatinized pregelatinized components.

This two pass extrusion method is used to extrude a second pass admixture containing milk proteins, such as in the form of milk chocolate, casein, and other types of casein proteins at a relatively temperature of less than 140° Fahrenheit to prevent protein denaturing and degradation but at an ultrahigh extrusion pressure of at least 2000 PSI, preferably at least 3000 PSI, more preferably at least 4000 PSI, and even more preferably at least 5000 PSI, for a relatively short protein preserving residency time of no greater than 15 seconds, preferably no greater than 10 seconds and more preferably no greater than about 7 seconds±2 seconds to produce at least one of an extruded food product, a food product extrudate, an instantized extruded food product, an instantized food product extrudate, extruded food product constituent or ingredient, a food product extrudate constituent or ingredient, an instantized extruded food product constituent or ingredient, an instantized food product extrudate constituent or ingredient containing the milk protein or milk proteins extruded therein that preferably provide one of flavor, taste, aroma, and/or flavor intensity. In one preferred two-pass extrusion method and embodiment, granular milk protein(s) in the form of milk chocolate that preferably is in powdered form is part of a starch-containing second extrusion pass admixture that includes at least pregelatinized starch from the starch-containing first extrusion pass admixture that is extruded during the second extrusion pass at a protein denaturing or degradation preventing extrusion temperature of no greater than 140° Fahrenheit and preferably no greater than 140° Fahrenheit at an ultrahigh extrusion pressure of at least 2000 PSI, preferably at least 3000 PSI, more preferably at least 4000 PSI, and even more preferably at least 5000 PSI for a protein protecting relatively short residency time of no more than about 8 seconds and preferably no more than about 5 seconds±1 second to produce an instantized or gelling chocolate flavored food product or an instantized or gelling chocolate flavored food product constituent that can be used as an ingredient of another food product that imparts a chocolate flavor thereto. The starch-containing component of the first pass extrusion admixture and the second pass extrusion admixture preferably is provided by one or more cereal grains or legumes as previously disclosed hereinabove.

The present invention also is directed to an extruded food product constituent composed of a gelling food product constituent extrudate and method of extruding a gelling food product constituent extrudate used as an ingredient of a food product normally using a gelling gum, like guar gum, xanthan gum or carrageenan as an ingredient. The gelling food product extrudate is composed of cold-water soluble gelling pregelatinized starch formed of starch in a starch-containing admixture modified by extrusion at extrusion pressures greater than 2000 PSI that gels when mixed with water, which preferably also modifies additional starch or starches in the admixture into a plurality of different molecular weight polymers of a cold-water soluble gellant that polymerize forming a gel when mixed with water, preferably forming a hydrocolloid gel, which more preferably is a self-gelling gel, which even more preferably is a thermoreversible gel crosslinked by one or more proteins freed by or modified during extrusion. Preferred admixtures configured to produce gelling extrudates include admixtures composed of cereal grains, including sorghum, wheat, oats, barley and/or corn, and/or legumes, including chick pea, yellow pea, pea and/or lentils with legume containing admixtures producing gelling extrudates that form thicker gels whose viscosity increases over time that are well suited for use in non-dairy dairy substitutes like non-dairy butter made of a butter-like viscosity food emulsion made with a single component or dual component gelling food product constituent extrudate or extruded gelling food product constituent composed of such a single component or dual component gelling food product constituent extrudate as an ingredient thereof, a non-dairy creamer made of a creamer-like consistency and viscosity food emulsion made with a single component or dual component gelling food product constituent extrudate or extruded gelling food product constituent composed of such a single component or dual component gelling food product constituent extrudate as an ingredient thereof, non-dairy whipped cream made of a cream food emulsion having a whipped cream consistency and viscosity made with a single component or dual component gelling food product constituent extrudate or extruded gelling food product constituent composed of such a single component or dual component gelling food product constituent extrudate as an ingredient thereof, non-dairy yogurt containing live cultures in a yogurt food emulsion made with a single component or dual component gelling food product constituent extrudate or extruded gelling food product constituent composed of such a single component or dual component gelling food product constituent extrudate as an ingredient thereof, non-dairy cheese made of a cheese-like food emulsion or room temperature stable gel that is sliceable at room temperature and which has a consistency and viscosity of a dairy cheese that is made with a single component or dual component gelling food product constituent extrudate or extruded gelling food product constituent of the present invention composed of such a single component or dual component gelling food product constituent extrudate as an ingredient thereof extruded of a legume, preferably chickpea and/or yellow pea admixture, and non-dairy ice cream including vegan non-dairy substitutes like vegan non-dairy butter, vegan non-dairy creamers, vegan non-dairy whipped cream, vegan non-dairy yogurt, non-dairy cheese, and non-dairy ice cream.

Other embodiments and uses of the invention will be apparent to those skilled in the art from consideration from the specification and practice of the invention disclosed herein. All references cited herein for any reason, including all journal citations and U.S./foreign patents and patent applications, are specifically and entirely incorporated herein by reference. It is understood that the invention is not confined to the specific materials, methods, formulations, operating/assay conditions, etc., herein illustrated and described, but embraces such modified forms thereof as come within the scope of the following claims.

What is claimed is:

1. A food product comprising:
   (a) a first food product constituent that provides at least one of nutrition, taste, flavor, smell, texture, and mouthfeel; and
   (b) a second food product constituent comprised of starch modified during extrusion in an extruder at an extrusion pressure of at least 2000 PSI into an extrusion-modified gelling starch that gels or forms a gel when mixed with water; and
   (c) water in an amount sufficient for at least a portion of the extrusion-modified gelling starch in the second food product constituent to gel or form a gel;
   wherein the food product (i) is a homogenous mixture in which one of the first and second food product constituents is dispersed throughout the other one of the first and second food product constituents; (ii) contains a gel formed of the extrusion-modified gelling starch, and (iii) remains in a viscous state having a viscosity of at least 10,000 centipoise; and wherein the food product comprises a closed system where the water in the food product remains therein by preventing evaporation therefrom.

2. The food product of claim 1, wherein the extrusion-modified gelling starch is comprised of a pregelatinized starch and a cold-water soluble starch gellant, and wherein the gel in the food product comprises a hydrocolloid gel.

3. The food product of claim 2, wherein the cold-water soluble starch gellant forms the hydrocolloid gel in the food product.

4. The food product of claim 2, wherein the hydrocolloid gel comprises a thermoreversible gel.

5. The food product of claim 4, wherein the cold-water soluble starch gellant forms the thermoreversible gel in the food product.

6. The food product of claim 1, wherein the closed system comprises a package in which the food is packaged, the package comprising a substantially sealed package that prevents water in the food from evaporating out of the food.

7. The food product of claim 1, wherein the second food product constituent is a gelling agent.

8. The food product of claim 7, wherein the food product comprises one of a dairy-free cheese, a vegan dairy-free cheese, a dairy-free milk, a vegan dairy-free milk, a dairy-free ice cream, a vegan dairy-free ice cream, a dairy-free butter, a vegan dairy-free butter, a dairy-free cultured butter, a vegan dairy-free cultured butter.

9. The food product of claim 7, wherein the food product comprises one of a dairy-free ice cream base and a vegan dairy-free ice cream base.

10. The food product of claim 9, wherein the food product comprises one of a dairy-free ice cream and a vegan dairy-free ice cream made with one of the dairy-free ice cream base and the vegan dairy-free ice cream base.

11. The food product of claim 1, wherein the second food product constituent is a thickener or thickening agent.

12. The food product of claim 1, wherein the second food product constituent further comprises starch or fiber that forms a gel matrix in the food product, the food product comprised of the gel matrix formed thereby.

13. The food product of 12, wherein the fiber comprises fiber freed or modified during extrusion or the starch comprises resistant starch formed of starch modified during extrusion.

14. The food product of claim 1, wherein the second food product constituent further comprises protein freed or modified during extrusion that crosslinks the extrusion-modified gelling starch when mixed with water and forms at least some of the gel in the food product.

15. The food product of claim 14, wherein the second food product constituent further comprises starch or fiber that forms a gel matrix in the food product, the food product further comprising the gel matrix formed thereby.

16. The food product of 15, wherein the fiber comprises fiber freed or modified during extrusion and the starch comprises resistant starch formed of starch modified during extrusion.

17. The food product of claim 1, wherein the gel in the food product comprises a hydrocolloid gel.

18. The food product of claim 1, wherein the gel in the food product comprises a thermoreversible gel.

19. The food product of claim 1, wherein the gel in the food product comprises a self-gelling gel.

20. The food product of claim 1, wherein the second food product constituent is a gum or functions as a food gum substitute.

21. The food product of claim 1, wherein the second food product constituent is an emulsifier or an emulsifying agent.

22. The food product of claim 1, wherein the second food product constituent is a humectant.

23. The food product of claim 1, wherein the second food product constituent is a stabilizer or stabilizing agent.

24. The food product of claim 1, wherein the extrusion modified gelling starch is comprised of a (1) a first gelling component comprised of some starch in the starch-containing admixture extrusion modified into a water-soluble extrusion-modified starch gellant, and (2) a second gelling component comprised of other starch in the starch-containing admixture extrusion modified into a pregelatinized starch.

25. The food product of claim 24, wherein the water-soluble extrusion-modified starch gellant is comprised of a hydrocolloid that gels or forms gel when mixed with water.

26. The food product of claim 1, wherein the first product constituent and the second food product constituent are extruded together in the extruder at the extrusion pressure of at least 2000 PSI.

27. The food product of claim 26, wherein the food product has a viscosity ranging between 20,000 and 60,000 centipoise.

28. The food product of claim 26, wherein the food product has a viscosity ranging between 70,000 and 140,000 centipoise.

29. The food product of claim 26, wherein the food product has a viscosity ranging between 150,000 and 300,000 centipoise.

30. A food product comprised of a plurality of pairs of constituents, the food product comprising:
(a) a first food product constituent that provides at least one of nutrition, taste, flavor, smell, texture, and mouthfeel;
(b) a second food product constituent that provides at least one of nutrition, taste, flavor, smell, texture, and mouthfeel that is different than the first food product constituent;
(c) a third food product constituent comprising an extruded flour comprised of starch modified during extrusion into (i) an extrusion-modified pregelatinized starch, and (ii) an extrusion-modified starch gellant configuring the extruded flour to form a gel when mixed with water; and
(d) water mixed with the first, second and third food product constituents in an amount sufficient to cause at least some of the third food product constituent to form a gel and produce a food product comprised of the gel formed thereby and which is a shelf-stable gel or a shelf-stable emulsion; and
wherein the food product comprised of the gel is a shelf-stable gel or shelf-stable emulsion and has a shelf life of at least 6 months.

31. The food product of claim 30, wherein the third food product constituent further comprises starch or fiber that forms a gel matrix in the food product, the food product comprised of the gel matrix formed thereby first.

32. The food product of 31, wherein the fiber comprises fiber freed or modified during extrusion or the starch comprises resistant starch.

33. The food product of claim 30, wherein the third food product constituent further comprises protein freed or modified during extrusion that crosslinks the extrusion-modified starch gellant when mixed with water and forms at least some of the gel in the food product.

34. The food product of claim 33, wherein the third food product constituent further comprises starch or fiber that forms a gel matrix in the food product, the food product further comprising the gel matrix formed thereby.

35. The food product of claim 30, wherein the gel comprises a hydrocolloid gel.

36. The food product of claim 30, wherein the gel comprises a thermoreversible gel.

37. The food product of claim 30, wherein the gel comprises a self-gelling gel.

38. The food product of claim 30, wherein the gel comprises a thermally stable self-gelling gel.

39. The food product of claim 30, wherein the food product is a shelf-stable emulsion and comprises a dressing, an ice cream, a non-dairy milk, a vegan non-dairy milk, a non-dairy creamer, a vegan non-dairy creamer, a non-dairy whipped cream, a vegan non-dairy whipped cream, a non-dairy yogurt, a vegan non-dairy yogurt, a non-dairy butter, a vegan non-dairy butter, a non-dairy cheese, a vegan non-dairy cheese, a non-dairy cream cheese, a vegan non-dairy cream cheese, a non-dairy ice cream, a vegan non-dairy ice cream, or a meatless meat substitute.

40. The food product of claim 30, wherein the food product is a shelf-stable gel and comprises one of a porridge, a pudding, a soup, a sauce, a dressing and a cream.

41. A food product comprising:
(a) a first food product constituent that provides at least one of nutrition, taste, flavor, smell, texture, and mouthfeel;
(b) a second food product constituent that provides at least one of nutrition, taste, flavor, smell, texture, and mouthfeel;
(c) a third food product constituent comprising an extruded food product constituent-binding flour containing starch modified during extrusion into a water-soluble binder, the extruded food product constituent-binding flour binding together the first food product constituent and the second food product constituent when the first, second and third food product constituents are mixed together with water; and
(d) water mixed therewith; and
wherein the food product is a homogenous mixture of the first, second, and third food product constituents mixed with the water.

42. The food product of claim 41, wherein the extruded food product constituent-binding flour is comprised of a starch-containing admixture extruded from an extruder under a high enough extrusion pressure such that at least some of the starch in the admixture is modified thereby into a cold water soluble binder that comprises the water-soluble binder that binds together the first food product constituent and the second food product constituent when a mixture comprised of the first, second and third food product constituents are mixed together with water.

43. The food product of claim 41, wherein (1) the water-soluble binder is comprised of an extrusion-modified starch, and (2) the first, second and third food product constituents mixed together with the water form a food product mixture bound together by the water-soluble binder that is dried to form the food product.

44. The food product of claim 43, wherein the food product formed after drying the food product mixture is a solid edible food snack.

45. The food product of claim 44, wherein the solid edible food snack is one of a chip, a baked chip, a tortilla chip, a gluten-free tortilla chip, a baked tortilla chip, a baked gluten-free tortilla chip, a grain-free tortilla chip, a baked grain-free tortilla, a gluten-free grain-free tortilla chip, a cracker, a baked cracker, a gluten-free cracker, a baked gluten-free cracker, a grain-free cracker, a baked grain-free cracker, a gluten-free grain-free cracker, a baked gluten-free grain-free cracker, a crisp, a baked crisp, a gluten-free crisp, a baked gluten-free crisp, a potato crisp, and a baked potato crisp.

46. The food product of claim 44, wherein the solid edible food snack is one of a snack bar, a baked snack bar, a gluten-free snack bar, a baked gluten-free snack bar, a grain free snack bar, a baked grain-free snack bar, a gluten-free grain-free snack bar, a granola bar, a baked granola bar, a gluten-free granola bar, and a baked gluten-free granola bar.

* * * * *